US008422850B2

(12) United States Patent
Nakane

(10) Patent No.: US 8,422,850 B2
(45) Date of Patent: Apr. 16, 2013

(54) INFORMATION RECORDING APPARATUS, INFORMATION RECORDING METHOD, INFORMATION RECORD MEDIUM, INFORMATION REPRODUCING APPARATUS, INFORMATION REPRODUCING METHOD, INFORMATION TRANSMITTING APPARATUS, AND INFORMATION TRANSMITTING METHOD

(75) Inventor: Kazuhiko Nakane, Tokyo (JP)

(73) Assignee: Mitusbishi Electric Corporation, Tokyo (JP)

( * ) Notice: Subject to any disclaimer, the term of this patent is extended or adjusted under 35 U.S.C. 154(b) by 709 days.

(21) Appl. No.: 12/532,671

(22) PCT Filed: Feb. 28, 2008

(86) PCT No.: PCT/JP2008/053473
§ 371 (c)(1),
(2), (4) Date: Sep. 23, 2009

(87) PCT Pub. No.: WO2008/126493
PCT Pub. Date: Oct. 23, 2008

(65) Prior Publication Data
US 2010/0067871 A1    Mar. 18, 2010

(30) Foreign Application Priority Data

Apr. 9, 2007    (JP) .................................. 2007-101286

(51) Int. Cl.
*H04N 5/91*    (2006.01)

(52) U.S. Cl.
USPC ......................................................... 386/232

(58) Field of Classification Search .................. None
See application file for complete search history.

(56) References Cited

U.S. PATENT DOCUMENTS

2001/0014058 A1 *   8/2001   Ando et al. ..................... 369/32
2002/0018643 A1     2/2002   Okada et al.
(Continued)

FOREIGN PATENT DOCUMENTS

JP    8-273304 A    10/1996
JP    9-298737 A    11/1997
(Continued)

OTHER PUBLICATIONS

Edited by Maruchimedia Tsushin Kenkyukai, Point Zukaishiki Jissen MPEG Kyokasho, first edition Ascii Corp., Nov. 1, 1995, pp. 121-124.

(Continued)

*Primary Examiner* — Thai Tran
*Assistant Examiner* — Sunghyoun Park
(74) *Attorney, Agent, or Firm* — Birch, Stewart, Kolasch & Birch, LLP

(57) ABSTRACT

An apparatus and a method, which make it possible to collect a plurality of the contents authored for DVD to record easily them on a large-capacity information record medium and to increase a data rate in reproducing the recorded contents, perform the processes of: creating source packets from a disk image file; collecting them to form arrangement units 320; collecting them to form ECC clusters; collecting sectors of the DVD to form a sector group, thereby storing it while bringing it into correspondence with a predetermined number of source packets; adding a control packet to this to form units of conversion; collecting them to bring them into correspondence with an integral number of the arrangement units 320; and storing a cluster-number, at which a leading sector of the sector group of the DVD is stored in the control packet; wherein the source packets are brought into correspondence so that a leading portion of the file system area coincides with both a leading portion of the arrangement unit and a leading portion of the error correction cluster and the disk image file is recorded using units of the length so that the length causes a boundary of the units of conversion to coincide with a boundary of the ECC clusters.

2 Claims, 26 Drawing Sheets

U.S. PATENT DOCUMENTS

| | | | |
|---|---|---|---|
| 2003/0126537 A1* | 7/2003 | Han et al. | 714/752 |
| 2004/0027890 A1 | 2/2004 | Nakanishi et al. | |
| 2004/0208135 A1 | 10/2004 | Nakamura et al. | |
| 2004/0234240 A1* | 11/2004 | Kurosawa et al. | 386/82 |
| 2006/0133223 A1* | 6/2006 | Nakamura et al. | 369/30.3 |

FOREIGN PATENT DOCUMENTS

| | | |
|---|---|---|
| JP | 2001-167528 A | 6/2001 |
| JP | 2001-250337 A | 9/2001 |
| JP | 2002-218398 A | 8/2002 |
| JP | 2003-100055 A | 4/2003 |
| JP | 2003-123392 A | 4/2003 |
| JP | 2003-151222 A | 5/2003 |
| JP | 2004-112188 A | 4/2004 |
| JP | 2005-92830 A | 4/2005 |
| JP | 2005-513936 A | 5/2005 |
| JP | 2005-159703 A | 6/2005 |
| WO | WO-97/14147 A1 | 4/1997 |
| WO | WO-2008/105236 A1 | 9/2008 |

OTHER PUBLICATIONS

Mochiki, "DVD&DVC Nyumon Kihon", Chapter 18, first print, Dempa Publications, Inc., Oct. 20, 1996, p. 69-70.

ECMA Standardizing Information and Communication Systems, "120mm DVD—Read-Only Disk", Standard ECMA-267, 3rd edition, Apr. 2001.

* cited by examiner

FIG. 22

| DATA ARRANGEMENT ON DVD | | | | | ARRANGEMENT ON LARGE-CAPACITY OPTICAL DISK | |
| --- | --- | --- | --- | --- | --- | --- |
| | No. | SECTOR-NUMBER | ECC BLOCK-NUMBER | No. | No. | ECC CLUSTER-NUMBER |
| DATA AREA OF FIRST RECORDING LAYER | 1 | 30000h – 3000Fh | 3000h | 1 | 1 | 100000h |
| | | ... | ... | ... | ... | ... |
| | | 30BF0h – 30BFFh | 30BFh | 192 | 99 | 100062h |
| | 2 | 30C00h – 30C0Fh | 30C0h | 193 | 100 | 100063h |
| | | ... | ... | ... | ... | ... |
| | | 317F0h – 317FFh | 317Fh | 384 | 198 | 1000C5h |
| | ... | 31800h – 3180Fh | 3180h | 385 | 199 | 1000C6h |
| | | ... | ... | ... | ... | ... |
| | | 2333F0h – 2333FFh | 2333Fh | 131904 | 68013 | 1109ACh |
| | 688 | 233400h – 23340Fh | 23340h | 131905 | 68014 | 1109ADh |
| | | ... | ... | ... | ... | ... |
| | | 233FF0h – 233FFFh | 233FFh | 132096 | 68112 | 110A0Fh |
| DATA AREA OF SECOND RECORDING LAYER | 689 | DCC000h – DCC00Fh | DCC00h | 132097 | 68113 | 110A10h |
| | | ... | ... | ... | ... | ... |
| | | DCCBF0h – DCCBFFh | DCCBFh | 132288 | 68211 | 110A72h |
| | ... | ... | ... | ... | ... | ... |
| | 1376 | FCF400h – FCF40Fh | FCF40h | 264001 | 136126 | 1213BDh |
| | | ... | ... | ... | ... | ... |
| | | FCFFF0h – FCFFFFh | FCFFFh | 264192 | 136224 | 12141Fh |

FIG. 23

1 PACKET (188 BYTES)

| Field | Description |
|---|---|
| ID | : PACKET IDENTIFICATION CODE |
| X | : LAST SECTOR-NUMBER OF DATA AREA OF FIRST RECORDING LAYER OF DVD IMAGE |
| Z | : LAST SECTOR-NUMBER OF DATA AREA OF SECOND RECORDING LAYER OF DVD IMAGE |
| $\Delta_1$ | : NUMBER OF PADDING SECTORS AT ENDING PORTION OF DATA AREA OF FIRST RECORDING LAYER OF DVD IMAGE |
| $\Delta_2$ | : NUMBER OF PADDING SECTORS AT LEADING PORTION OF DATA AREA OF SECOND RECORDING LAYER OF DVD IMAGE |
| $\Delta_3$ | : NUMBER OF PADDING SECTORS AT ENDING PORTION OF DATA AREA OF SECOND RECORDING LAYER OF DVD IMAGE |
| P | : ECC CLUSTER-NUMBER, AT WHICH LEADING PORTION OF DATA AREA OF FIRST RECORDING LAYER OF DVD IMAGE IS STORED |
| Q | : ECC CLUSTER-NUMBER, AT WHICH LEADING PORTION OF DATA AREA OF SECOND RECORDING LAYER OF DVD IMAGE IS STORED |
| U | : ECC CLUSTER-NUMBER, AT WHICH LEADING PORTION OF FILE SYSTEM AREA OF FIRST RECORDING LAYER OF DVD IMAGE IS STORED |
| V | : ECC CLUSTER-NUMBER, AT WHICH LEADING PORTION OF FILE SYSTEM AREA OF SECOND RECORDING LAYER OF DVD IMAGE IS STORED |
| C | : ECC CLUSTER-NUMBER, AT WHICH LEADING SECTOR OF THIS SECTOR GROUP IS STORED |

SPARE AREA (144 BYTES)

FIG. 28

| DEFINITIONS OF PARAMETERS OF FIRST BYTE IN CONTROL BYTE AREA |
|---|

1 SECTOR (13 BYTES):
- a1–a2: ID : PACKET IDENTIFICATION CODE (2 BYTES)
- a3: Area : DENOTES AREA TO WHICH THIS SECTOR BELONGS (1 BYTE)
- a4: Scp : DENOTES STATE OF ENCRYPTION OF THIS SECTOR (1 BYTE)
- a5–a12: C : ECC CLUSTER-NUMBER, AT WHICH THIS SECTOR IS STORED (8 BYTES)
- a13: SPARE AREA (1 BYTE)

ABOVE-MENTIONED DEFINITIONS OF PARAMETERS IN CONTROL BYTE INDICATE THE CASE OF FIRST SECTOR OF ECC BLOCK.
SAME PARAMETERS ARE ALLOCATED IN SAME ORDER AS BYTE ARRANGEMENT IN LEADING SECTOR TO SECOND SECTOR AND SUBSEQUENT SECTORS.
CORRESPONDENCES ARE AS FOLLOWS:

| ABOVE DEFINITIONS | CONTROL BYTES CORRESPONDING TO LEFT INDICATED DEFINITIONS |
|---|---|
| a1–a2 | a14–a15, a27–a28, a40–a41, a53–a54, a66–a67, a79–a80, a92–a93, a105–a106, a118–a119, a131–a132, a144–a145, a157–a158, a170–a171, a183–a184, a196–a197 |
| a3 | a16, a29, a42, a55, a68, a81, a94, a107, a120, a133, a146, a159, a172, a185, a198 |
| a4 | a17, a30, a43, a56, a69, a82, a95, a108, a121, a134, a147, a160, a173, a186, a199 |
| a5–a12 | a18–a25, a31–a38, a44–a51, a57–a64, a70–a77, a83–a90, a96–a103, a109–a116, a122–a129, a135–a142, a148–a155, a161–a168, a174–a181, a187–a194, a200–a207 |
| a13 | a26, a39, a52, a65, a78, a91, a104, a117, a130, a143, a156, a169, a182, a195, a208 |

FIG. 29

| | DEFINITIONS OF PARAMETERS OF SECOND BYTE IN CONTROL BYTE AREA |
|---|---|
| b1-b4 | ID : PACKET IDENTIFICATION CODE |
| b5-b8 | X : LAST SECTOR-NUMBER OF DATA AREA OF FIRST RECORDING LAYER OF DVD IMAGE |
| b9-b12 | Z : LAST SECTOR-NUMBER OF DATA AREA OF SECOND RECORDING LAYER OF DVD IMAGE |
| b13-b16 | $\Delta_1$ : NUMBER OF PADDING SECTORS AT ENDING PORTION OF DATA AREA OF FIRST RECORDING LAYER OF DVD IMAGE |
| b17-b20 | $\Delta_2$ : NUMBER OF PADDING SECTORS AT LEADING PORTION OF DATA AREA OF SECOND RECORDING LAYER OF DVD IMAGE |
| b21-b24 | $\Delta_3$ : NUMBER OF PADDING SECTORS AT ENDING PORTION OF DATA AREA OF SECOND RECORDING LAYER OF DVD IMAGE |
| b25-b28 | P : ECC CLUSTER-NUMBER, AT WHICH LEADING PORTION OF DATA AREA OF FIRST RECORDING LAYER OF DVD IMAGE IS STORED |
| b29-b32 | Q : ECC CLUSTER-NUMBER, AT WHICH LEADING PORTION OF DATA AREA OF SECOND RECORDING LAYER OF DVD IMAGE IS STORED |
| b33-b36 | U : ECC CLUSTER-NUMBER, AT WHICH LEADING PORTION OF USER FILE AREA OF DVD IMAGE ON FIRST RECORDING LAYER IS STORED |
| b37-b40 | V : ECC CLUSTER-NUMBER AT WHICH LEADING PORTION OF FILE SYSTEM AREA OF SECOND RECORDING LAYER OF DVD IMAGE IS STORED |
| b41 - b208 | SPARE AREA (168 BYTES) |

1 ECC CLUSTER (208 BYTES)

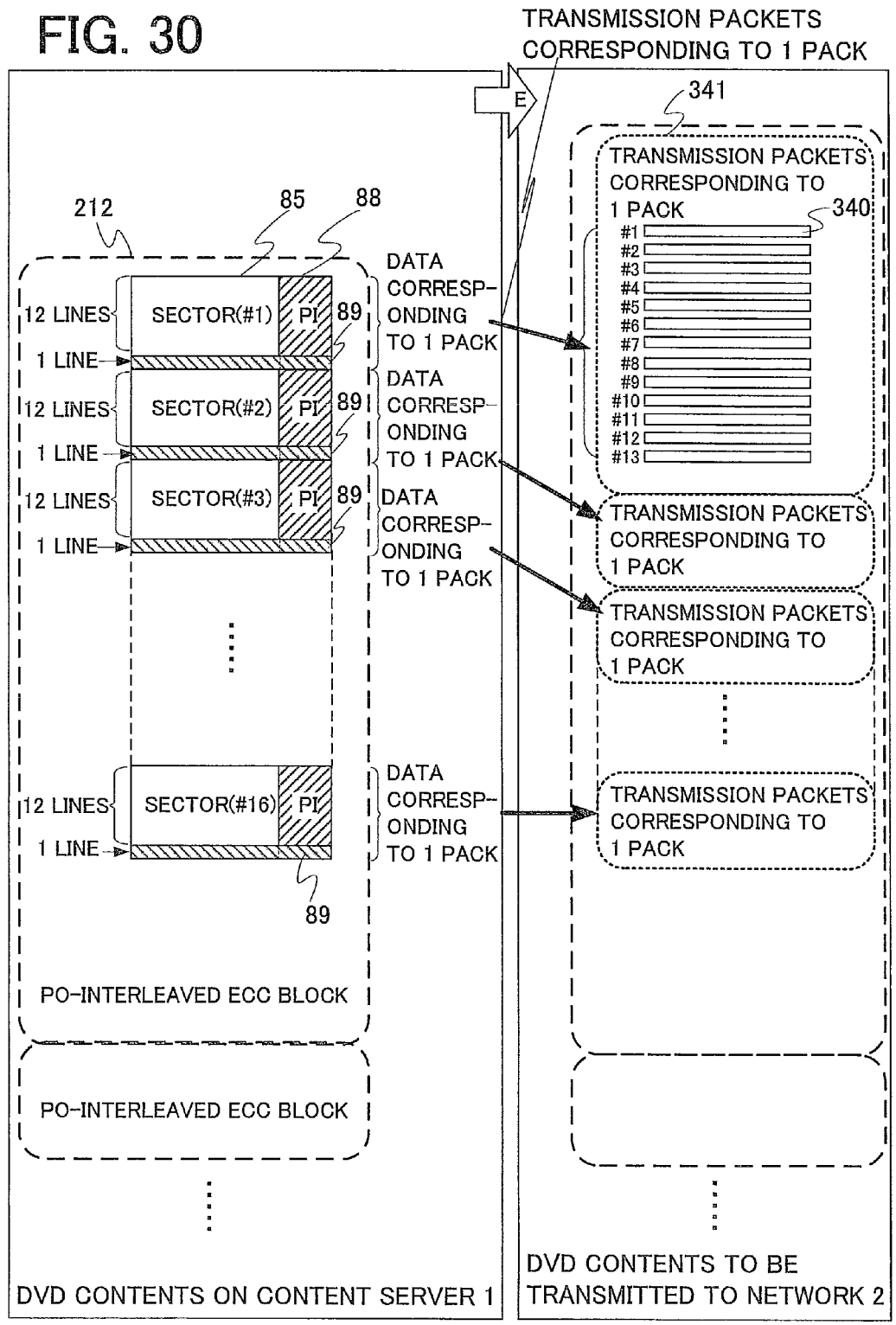

INFORMATION RECORDING APPARATUS, INFORMATION RECORDING METHOD, INFORMATION RECORD MEDIUM, INFORMATION REPRODUCING APPARATUS, INFORMATION REPRODUCING METHOD, INFORMATION TRANSMITTING APPARATUS, AND INFORMATION TRANSMITTING METHOD

TECHNICAL FIELD

The present invention relates to an information recording apparatus and an information recording method for collecting a plurality of contents for DVD package media (the contents authored for DVD) to record them on a large-capacity information record medium; an information record medium, on which the contents have been recorded by the information recording method; an information reproducing apparatus and an information reproducing method for reproducing information from the information record medium; and an information transmitting apparatus and an information transmitting method for transmitting the contents for DVD package media.

BACKGROUND ART

There is a next-generation large-capacity optical disk such as a Blu-ray (Blu-ray) disc or an HDDVD as a video storage product, which has larger capacity than the current DVD and can store long high quality images, and a high-quality image reproduced from package media can be implemented using such large-capacity optical disk. There is also a trend to shift a sales pattern to the sales by the download distribution of the DVD contents, which have been being sold by the conventional package sales. For the time being, there is a prospect that contents for the next-generation large-capacity optical disk will be being sold as package media because of a massive amount of data, whereas the sales of the current contents authored for DVD by download distribution will increase.

If the sales by download distribution increase, it becomes important to collect a plurality of the contents authored for DVD to record them on a next-generation recordable large-capacity optical disk. It is conceivable that such recording method may be a method in which a plurality of the contents authored for DVD are downloaded to an information recording apparatus on a user's side and recorded on a recordable large-capacity optical disk on the user's side or a method in which a content provider produces a large-capacity optical disk package storing a plurality of the contents authored for DVD and supplies it to the user.

Incidentally, with regard to the current DVD formats, it is known that there are the ISO/IEC standard and the ECMA standard as an origin thereof, which are international standards (e.g., refer to Non-patent Document 1). Furthermore, with regard to the video recording, it is known that there are a technology by which the video data with navigation data are recorded on a record medium and reproduced from the record medium (e.g., refer to Patent Document 1) and a technology for copyright management of contents (e.g., refer to Patent Document 2). Moreover, with regard to a disk format technology for the next-generation large-capacity optical disk, it is conventionally known that there are a method of configuring an error correction cluster (e.g., refer to Patent Document 3), a technology for efficiently recording and reproducing a transport stream when a video file is recorded on the disk (e.g., refer to Patent Document 4), and a technology for converting between a transport stream and a program stream at a high speed using a relational expression correlating them (e.g., refer to Patent Document 5). In addition, with regard to a technology for download distribution of video contents via a network, it is known that there are a technology by which a content server transmits a download control file to a receiver side and it is downloaded (e.g., refer to Patent Document 6) and a technology for copyright management of contents (e.g., refer to Patent Document 7).

Non-patent Document 1 is ISO/IEC 16448, ECMA-267.
Patent Document 1 is Japanese Patent Application Kokai Publication No. H08-273304.
Patent Document 2 is WO97/14147 Publication.
Patent Document 3 is Japanese Patent Application Kokai Publication No. 2003-123392.
Patent Document 4 is Japanese Patent Application Kokai Publication No. 2001-167528.
Patent Document 5 is Japanese Patent Application Kohyo Publication No. 2005-513936.
Patent Document 6 is Japanese Patent Application Kokai Publication No. 2005-159703.
Patent Document 7 is Japanese Patent Application Kokai Publication No. 2005-092830.

DISCLOSURE OF THE INVENTION

Problems to be Solved by the Invention

However, in the above-described conventional arts, when the content authored for DVD is recorded on a recordable large-capacity optical disk, the content authored for DVD needs to be authored again so as to be in conformity with a content format defined for a large-capacity optical disk. For this reason, in the above-described conventional arts, there is a problem that it is difficult to use resources of the existing massive DVD contents easily.

Supposing that an information recording apparatus on the user's side is caused to have functions of format converting and reauthoring and the download distributed content authored for DVD are recorded on a large-capacity optical disk on the user's side, a problem arises that the information recording apparatus on the user's side becomes expensive, thereby increasing a user's financial burden, and a risk increases in view of a function of the copyright protection.

In order to avoid such problem, it is conceivable that the contents authored for DVD have been reauthored in advance by the content server side so as to be in conformity with a large-capacity optical disk and the contents data conforming to a format of an optical disk desired by the user are distributed. However, in this case, a problem arises that the cost for the reauthoring on a side of the content server increases, and another problem arises that the user needs to decide whether the user uses a recordable large-capacity optical disk or a current recordable DVD, the user cannot freely combines any of the contents to be recorded on a single recordable large-capacity optical disk, thereby causing an inconvenience to the user.

Accordingly, the present invention has been made to resolve the problems in the above-described conventional arts and its object is to provide an information recording apparatus and an information recording method that can make it possible to collect a plurality of the contents authored for DVD to record them easily on a large-capacity information record medium and to increase a data rate when the recorded contents are reproduced; an information record medium on which the contents have been recorded by the information recording method; an information reproducing apparatus and an information reproducing method for reproducing information from such information record medium; and an information transmitting apparatus and an information transmitting method for transmitting a plurality of the contents authored for DVD so that they are collected and recorded easily on a large-capacity information record medium.

Means for Solving the Problems

In an information recording apparatus according to the present invention, the apparatus receives and records data of a content authored for DVD, wherein the DVD has a data area which includes a lead-in area, a lead-out area and a file system area based on the DVD standard and a user file area, and the information recording apparatus includes: a hard disk for storing the received data of the content authored for DVD; an optical disk device for recording the data of the content authored for DVD stored in the hard disk on the DVD or a large-capacity optical disk having larger recording capacity than the DVD; and a control means for controlling operation of the whole of the information recording apparatus; wherein the received data of the content authored for DVD is a disk image file, which includes data to be treated as main data in a sector of the DVD and header information of the sector; wherein the control means divides the disk image file into packets of a transport stream, adds an extended packet header to each of the divided packets of the transport stream, thereby forming a source packet as units of data of the large-capacity optical disk, collects a predetermined number of the source packets, thereby forming an arrangement unit, collects a predetermined number of the arrangement units, thereby forming an error correction cluster of the large-capacity optical disk, collects a predetermined number of the sectors of the DVD, thereby forming and storing a sector group while bringing the sector group into correspondence with the predetermined number of the source packets, adds a control packet to the predetermined number of the source packets corresponding to the sector group, thereby forming units of conversion between the sector group and the source packets, collects a predetermined number of the units of conversion, thereby bringing them into correspondence with an integral number of the arrangement units, and stores a cluster-number of the error correction cluster of the large-capacity optical disk, at which a leading sector of the sector group of the DVD is stored, in the control packet; and wherein in the disk image file containing a leading portion of the file system area of the DVD, the source packets are brought into correspondence so that the leading portion of the file system area coincides with both a leading portion of the arrangement unit and a leading portion of the error correction cluster, and the disk image file is recorded using a length as a unit, which causes a boundary of the units of conversion to coincide with a boundary of the error correction clusters or data padding is performed as necessary so that an ending portion of the disk image file terminates at the coincided boundaries of the units of conversion and of the error correction clusters.

Further, in an information recording method according to the present invention, for receiving from a content server and recording data of a content authored for DVD, wherein the DVD has a data area which includes a lead-in area, a lead-out area and a file system area based on the DVD standard and a user file area, wherein the information recording method uses an information recording apparatus including a hard disk for storing data of the received content authored for DVD and an optical disk device for recording the data of the content authored for DVD stored in the hard disk on the DVD or a large-capacity optical disk having larger recording capacity than the DVD; the method includes a step, in which the content server transmits data of the content authored for DVD as a disk image file, which includes data to be treated as main data in a sector of the DVD and header information of the sector; and the method includes the steps of: dividing the disk image file into packets of a transport stream, adding an extended packet header to each of the divided packets of the transport stream, thereby forming a source packet as units of data of the large-capacity optical disk, collecting a predetermined number of the source packets, thereby forming an arrangement unit, collecting a predetermined number of the arrangement units, thereby forming an error correction cluster of the large-capacity optical disk, collecting a predetermined number of the sectors of the DVD, thereby forming and storing a sector group while bringing the sector group into correspondence with the predetermined number of the source packets, adding a control packet to the predetermined number of the source packets corresponding to the sector group, thereby forming units of conversion between the sector group and the source packets, collecting a predetermined number of the units of conversion, thereby bringing them into correspondence with an integral number of the arrangement units, and storing a cluster-number of the error correction cluster of the large-capacity optical disk, at which a leading sector of the sector group of the DVD is stored, in the control packet; and wherein in the disk image file containing a leading portion of the file system area of the DVD, the source packets are brought into correspondence so that the leading portion of the file system area coincides with both a leading portion of the arrangement unit and a leading portion of the error correction cluster, and the disk image file is recorded using a length as a unit, which causes a boundary of the units of conversion to coincide with a boundary of the error correction clusters or data padding is performed as necessary so that an ending portion of the disk image file terminates at the coincided boundaries of the units of conversion and of the error correction clusters.

Furthermore, in an information record medium according to the present invention, data of a content authored for DVD are being recorded on the information record medium as a disk image file using any one of the above-described information recording apparatus or the above-described information recording method.

Moreover, in an information reproducing apparatus according to the present invention, the apparatus reproduces the above-described information record medium, which stores a disk image file of the content authored for DVD, wherein the information reproducing apparatus obtains a sector-number of a leading sector of a sector group being reproduced from the information record medium when the DVD is being played, obtains a cluster-number of an error correction cluster of the large-capacity optical disk storing the leading sector from the control packet of the sector group, and calculates a cluster-number of an error correction cluster to be accessed next on the basis of a difference between sector-numbers of a leading sector and a sector to be accessed next and the obtained cluster-number.

Further, in an information reproducing method according to the present invention, for reproducing the above-described information record medium, which stores a disk image file of the content authored for DVD, the information reproducing method includes the steps of: obtaining a sector-number of a leading sector of a sector group being reproduced from the information record medium when the DVD is being played; and obtaining a cluster-number of an error correction cluster of the large-capacity optical disk storing the leading sector from the control packet of the sector group; wherein a cluster-number of an error correction cluster to be accessed next is calculated on the basis of a difference between sector-numbers of a leading sector and a sector to be accessed next and the obtained cluster-number.

Furthermore, in an information transmitting apparatus according to the present invention, the apparatus includes: a means for converting content data including a video signal to a program stream by compressing coding; a means for dividing the program stream into packs with a constant length which are units to be stored on a sector of the record medium; a means for error-correction coding data of the divided packs by forming an error correction block from the predetermined number of sectors; a means for dividing the error-correction coded data arranged in order of recording on a track on a record medium into units of storing in a packet of the transport stream; and a means for transmitting the transport stream in units of the packet; wherein the means for dividing the error-correction coded data into the units of storing in the packet of the transport stream, sets the units of storing in the packet of the transport stream to be an error correction code word when the error correction block is formed and the error-correction coding is performed.

Moreover, in an information recording apparatus according to the present invention, the apparatus includes: a means for converting content data including a video signal to a program stream by compressing coding; a means for dividing the program stream into packs with a constant length which are units to be stored on a sector of the record medium; a means for error-correction coding data of the divided packs by forming an error correction block from the predetermined number of sectors; a means for dividing the error-correction coded data arranged in order of recording on a track on a record medium into units of the storing in a packet of the transport stream; and a means for recording the transport stream to be transmitted in units of the packet on the record medium; wherein the means for recording forms an integral number of error correction clusters using the predetermined number of consecutive packets as units of conversion, and the data of the transport stream are recorded so that a length which causes a boundary of the units of conversion to coincide with a boundary of the error correction clusters is treated as a unit or data padding is performed as necessary so that an ending portion of the data of the transport stream terminates at the coincided boundaries of the units of conversion and of the error correction clusters.

Advantageous Effects of the Invention

According to the present invention, since it becomes possible to use the contents authored for DVD for download distribution without reauthoring, the cost for contents reauthoring can be removed and therefore it becomes possible to supply the contents at a low price.

Furthermore, according to the present invention, it becomes possible to record a plurality of the contents authored for DVD downloaded by the user on a large-capacity optical disk and a user is allowed to combine freely a plurality of titles of contents to be recorded on the large-capacity optical disk.

Moreover, according to the present invention, with regard to a large-capacity optical disk storing a plurality of titles of the contents authored for DVD, it becomes possible to improve access performance when the content is being played and to improve access performance, such as speed and smoothness at fast-forwarding or fast-reversing, quickness of skip or jump operation, and reduction of time required for searching for a desired part, when various kinds of special reproduction are performed.

BRIEF DESCRIPTION OF THE DRAWINGS

FIG. 22 is a diagram for explaining operation of the information recording apparatus according to the first embodiment and illustrates a way of calculating the ECC cluster-number on the recordable large-capacity optical disk, at which the sector of the sector-number is stored, from the sector-number of the DVD.

FIG. 23 is a diagram for explaining operation of the information recording apparatus according to the first embodiment and illustrates a configuration of a location table of the sectors of the DVD.

FIG. 28 is a diagram illustrating configurations of the first bytes of the control byte area shown in FIG. 25.

FIG. 29 is a diagram illustrating configurations of the second bytes of the control byte area illustrated in FIG. 25.

FIG. 30 is a diagram illustrating a method of generating transmission packets when a content server sends out the DVD contents to a network.

Figure 1:
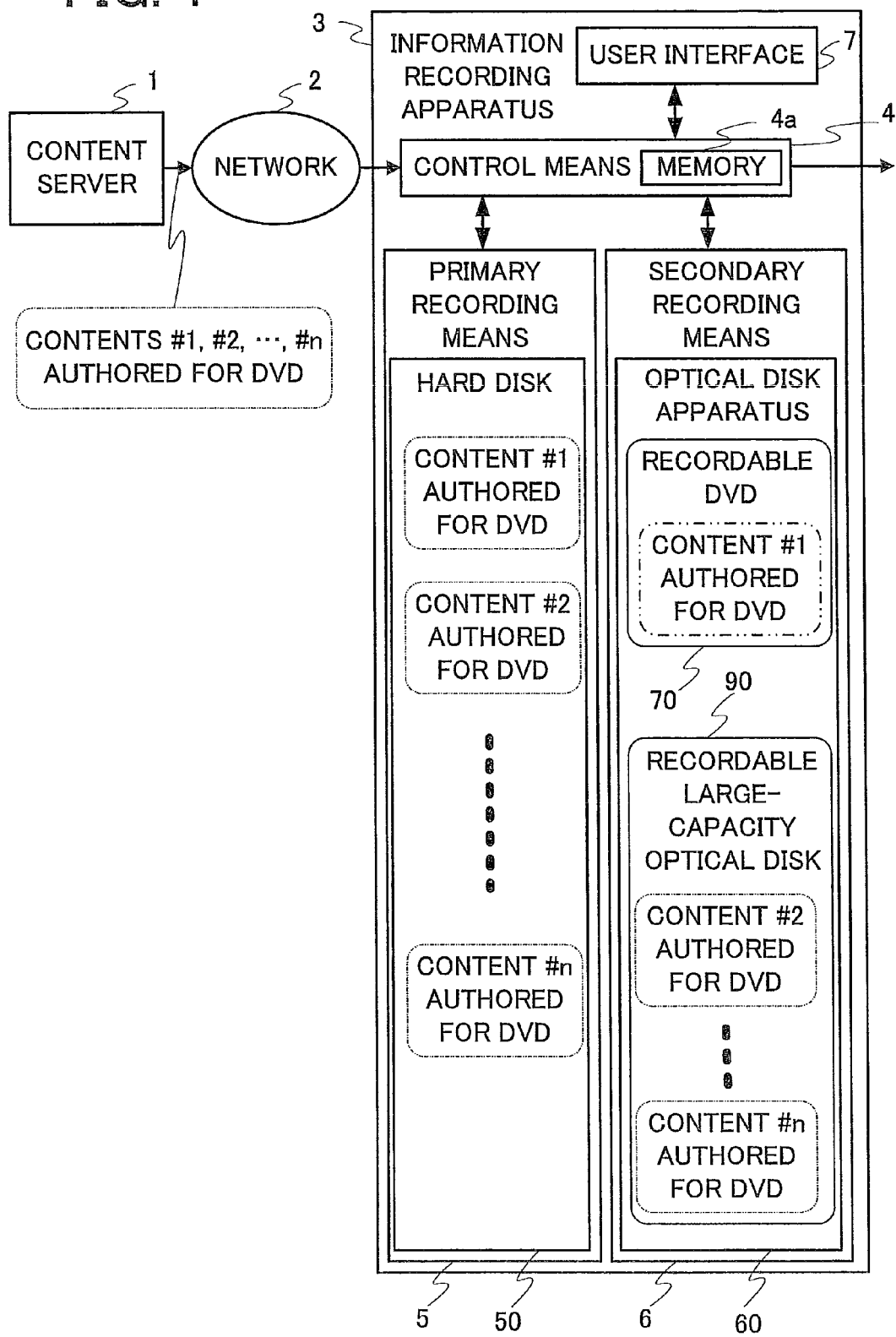
FIG. 1 is a block diagram schematically illustrating a configuration of a content download recording system, to which the present invention is applied.

EXPLANATION OF REFERENCE CHARACTERS 1 content server; 2 network; 3 information recording apparatus; 4 control means; 4a memory; 5 primary recording means; 6 secondary recording means; 11 content #1; 12 content #2; 13 content #3; 19 content #n; 50 hard disk; 51 lead-in area of hard disk; 53 file system-1 area of hard disk; 54 user file area of hard disk; 58 file system-2 area of hard disk; 59 lead-out area of hard disk; 60 optical disk device; 70 recordable DVD; 71 lead-in area of DVD; 72 data area of DVD; 73 file system-1 area of DVD; 74 user file area of DVD; 78 file system-2 area of DVD; 79 lead-out area of DVD; 80 physical sector; 81 header area; 82 main data; 83 error detection code (EDC); 84 sector-number; 85 sector; 86 synchronization information (SYNC); 87 error correction code (ECC); 88 inner parity (PI); 89 outer parity (PO); 90 recordable large-capacity optical disk; 91 lead-in area of recordable large-capacity optical disk; 93 file system-1 area of recordable large-capacity optical disk; 94 user file area of recordable large-capacity optical disk; 98 file system-2 area of recordable large-capacity optical disk; 99 lead-out area of recordable large-capacity optical disk; 100 index information file; 110, 120, 190 file of disk image data; 111, 121, 191 file of disk image data in lead-in area; 112, 192 file of disk image data in data area; 113 file of disk image data in file system-1 area; 114 file of disk image data in user file area; 118 file of disk image data in file system-2 area; 119, 129, 199 file of disk image data in lead-out area; 120 file of disk image data; 125 file of disk image data in data area of the first recording layer; 126 file of disk image data in data area of the second recording layer; 150 copyright protection information file group; 190 file of disk image data; 201 padding-1; 202 padding-2; 203 padding-3; 212 PO interleaved ECC block; 300 packet; 301 control packet; 302 sector group; 310 source packet; 320 arrangement unit; 330 control byte area; 340 transmission packet; 341 transmission packets corresponding to 1 pack.

BEST MODE FOR CARRYING OUT THE INVENTION

First Embodiment

FIG. 1 is a block diagram schematically illustrating a configuration of a content download recording system, to which the present invention is applied. As illustrated in FIG. 1, the content download recording system, to which the present invention is applied, includes a content server 1 capable of performing communication through a network 2 and an information recording apparatus 3 capable of performing communication through the network 2. The information recording apparatus 3 is an apparatus for performing an information recording method according to the present invention. Furthermore, the information recording apparatus 3 is, for example, an optical disk recorder with a built-in hard disk, and has a function of reading out and reproducing information from a record medium storing the information.

As illustrated in FIG. 1, the information recording apparatus 3 includes a control means 4 with a memory 4a; a primary recording means 5; a secondary recording means 6; and a user interface 7 such as an operating section on a main unit or a remote controller. The primary recording means 5 is generally a hard disk drive (HDD) including a hard disk 50 for storing information. The secondary recording means 6 is a device for recording information on an exchangeable medium, and includes, for example, an optical disk device 60. Any of a recordable DVD (Digital Versatile Disc) 70 which is the current recordable optical disk and a next-generation recordable large-capacity optical disk 90 can be selectively used as the exchangeable medium used in the secondary recording means 6. The recordable large-capacity optical disk 90 is, for example, a blue laser optical disk. The present invention can be applied to a system capable of recording a plurality of the contents authored for DVD, each of which has a program title, on the record medium having larger recording-capacity than the current DVD (e.g., the recording capacity enough for storing the contents of several current DVDs). Furthermore, the information recording apparatus 3 may includes a plurality of secondary recording means 6. In this case, a configuration may be adopted so that one of a plurality of the secondary recording means 6 is an optical disk recording apparatus 60 compatible with both the recordable DVD and the recordable large-capacity optical disk and the other of a plurality of the secondary recording means 6 is formed using a record medium other than an optical disk, such as a semiconductor memory or a magnetic memory.

The content server 1 stores a plurality of the contents authored for DVD as contents for distribution. The user uses the user interface 7 of the information recording apparatus 3 and sends a designation of the content desired for download distribution to the content server 1 through the network 2. If predetermined conditions such as user authentication and charging are satisfied, the content server 1 transmits the content(s) authored for DVD to the information recording apparatus 3 on the user's side through the network 2 in response to the user's request.

In the information recording apparatus 3, the control means 4 receives the data of the content(s) authored for DVD from the network 2, and first records the received data on the hard disk 50 in the primary recording means 5. In this way, the user can allow to record one or more desired contents authored for DVD from the contents stored in the content server 1 on the hard disk 50 in the primary recording means 5 by instructions using the user interface 7.

Further, the user specifies a desired content from a plurality of the contents authored for DVD recorded on the primary recording means 5 by instructions through the user interface 7, and causes the specified content authored for DVD to be recorded and stored on a recordable DVD 70 or a recordable large-capacity optical disk 90 inserted into the secondary recording means 6. The recording scheme at this time is different depending on utilization conditions determined for each content, and is "copy" which is the recording operation for recording data of the primary recording means 5 on the secondary recording means 6 while leaving available original data in the primary recording means 5 or "move" which is the recording operation for recording data of the primary recording means 5 on the secondary recording means 6 and thereafter deleting the data of the primary recording means 5.

Furthermore, the information recording apparatus 3 can be set so that the data stored in the primary recording means 5 is temporally recorded only before the data recording on the secondary recording means 6 is finished or the data are left in the primary recording means 5 before the user operates to issue removal instructions.

Figure 2:
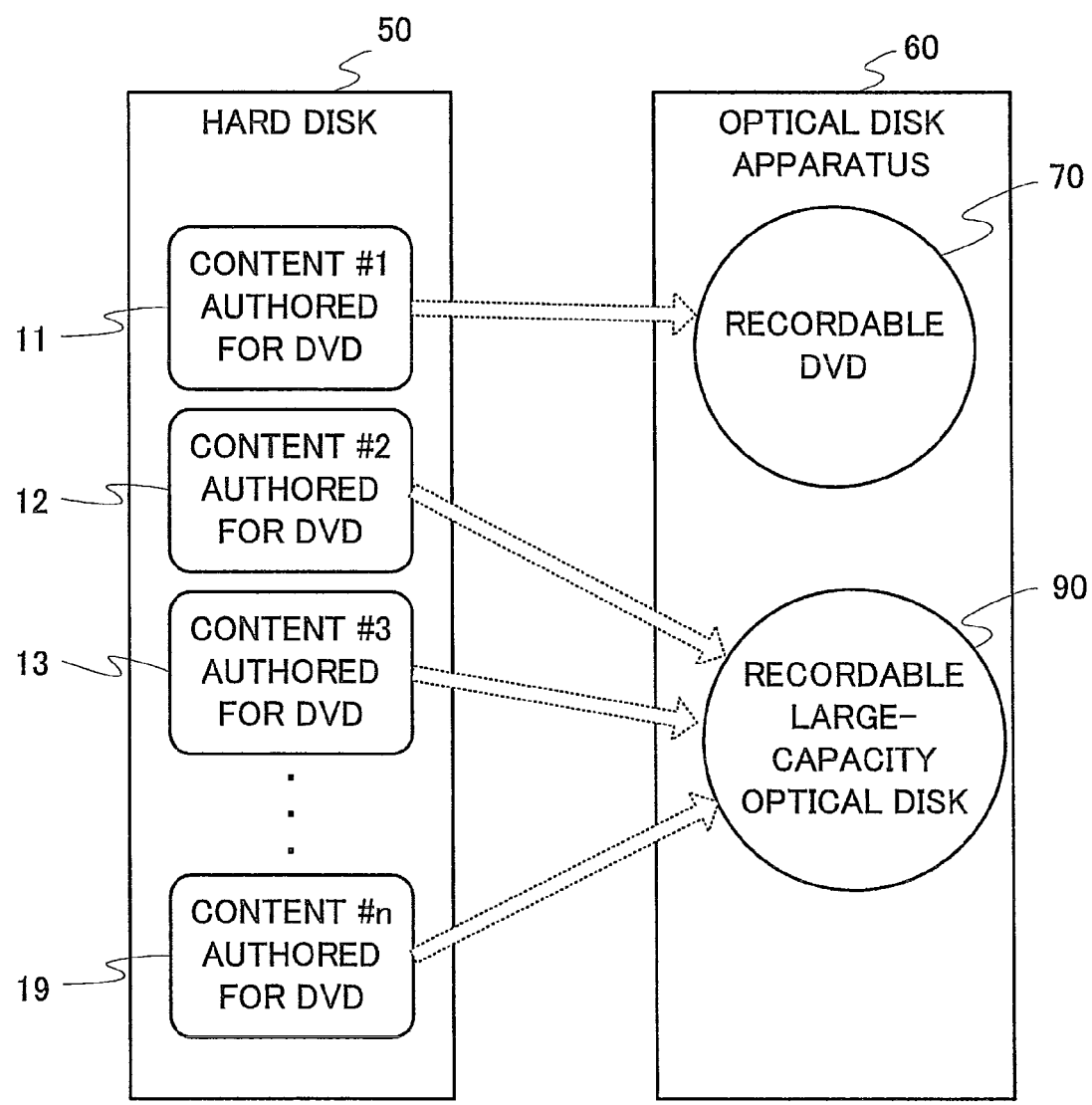
FIG. 2 is a diagram conceptually illustrating data recording operation from a hard disk included in a primary recording means to a recordable DVD or a recordable large-capacity optical disk in an optical disk device included in a secondary recording means in the information recording apparatus according to the first embodiment of the present invention.

FIG. 2 is a diagram conceptually illustrating data recording operation from the hard disk 50 included in the primary recording means 5 to the recordable DVD 70 or the recordable large-capacity optical disk 90 in the optical disk device 60 included in the secondary recording means 6, in the information recording apparatus 3 according to the first embodiment of the present invention. FIG. 2 illustrates an example in which a single content is selected from n contents of from a content authored for DVD (#1) 11 to a content authored for DVD (#n) 19 stored in the hard disk 50 and recorded on the recordable DVD 70 as a current optical disk by the optical disk device 60 or a plurality of contents are selected and recorded on the recordable large-capacity optical disk 90 by the optical disk device 60. A content authored for DVD is a content including video data, audio data, control data and so on created in conformity with the format prescribed by the current DVD standard. Further, for simplicity of description, a description will be made as to a case where a size of a single content authored for DVD is the size which can be contained in a single DVD.

Figure 3:
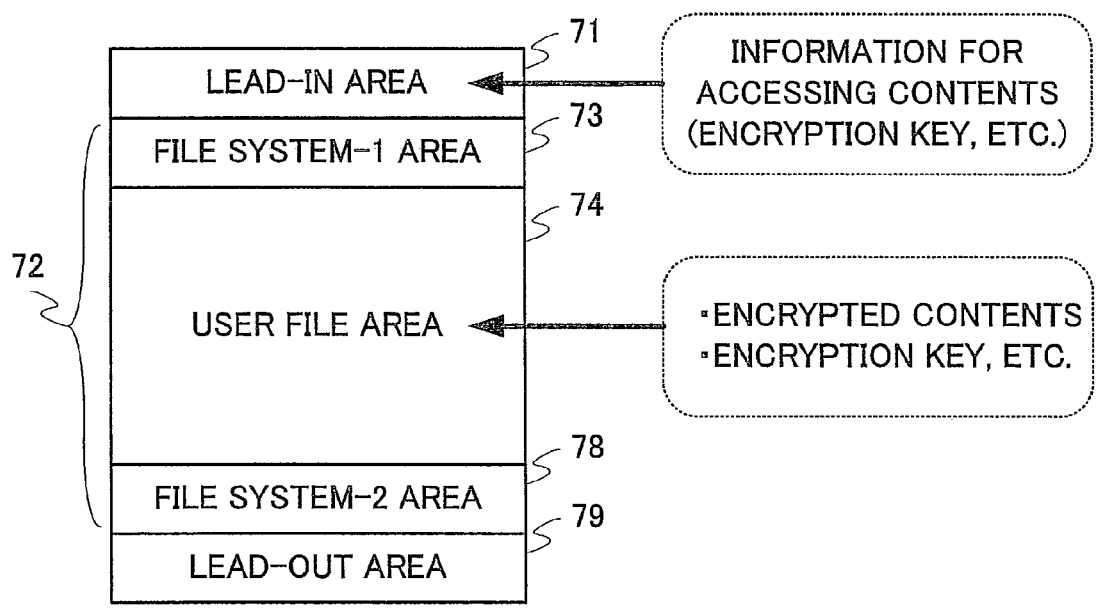
FIG. 3 is a diagram illustrating data structure of a content authored for DVD and details of the data to be recorded in each area.

FIG. 3 is a diagram illustrating data structure of the content authored for DVD and details of the data to be recorded in each area. As illustrated in FIG. 3, the information recording layer of the DVD includes a lead-in area 71, a data area 72, and a lead-out area 79, which are divided in a radial direction in conformity with the DVD standard. Furthermore, the data area 72 includes a file system-1 area 73, a user file area 74, and a file system-2 area 78, which are divided in the radial direction.

The lead-in area 71 contains the control information necessary for driving the DVD by the optical disk device and the information such as an encryption key necessary for accessing content if the content is encrypted by copyright protection technology. The user file area 74 contains the whole data including the encrypted portion and the information such as an encryption key necessary for decrypting the encrypted portion. The file system-1 area 73 and the file system-2 area 78 contain the management data such as a definition of the user file area 74, the location information of a user file in the user file area 74 and so on, that is, the information for configuring a file system such as a volume structure, a file structure and so on. The lead-out area 79 at the rear of the file system-2 area 78 is disposed as a margin area on the supposition that an optical head for reading the DVD may be moved outside the data area 72 in some cases.

As has been described above, the DVD contains the information necessary for reproducing the content in a distributed manner on each area of from the lead-in area 71 to the lead-out area 79, which are divided and arranged in a radial direction on the whole disk surface. For this reason, as illustrated in FIG. 2, when the optical disk device 60 records the content on the recordable DVD 70 or the recordable large-capacity optical disk 90 as a record medium, it is necessary to record the data of the whole disk of the DVD as a source of record. When the content authored for DVD is recorded on the recordable DVD 70, the data of the downloaded content can be recorded on the recordable DVD 70 without change, because a format of the recordable DVD 70 is the same as a format of the downloaded content. Furthermore, when the content authored for DVD is recorded on the recordable large-capacity optical disk 90, as the simplest way, there is a way of recording the whole of the data of the downloaded content authored for DVD (i.e., the data recorded on the whole disk of the DVD as a source of recording) as a disk image on the user file area (an area 94 in FIG. 4, which will be described below) on the recordable large-capacity optical disk 90. At this time, a format of the downloaded content (the content authored for DVD) is different from a format of the content on the recordable large-capacity optical disk 90 (the content authored for recordable large-capacity optical disk). Accordingly, when the content authored for DVD is recorded as a disk image on the user file area (the area 94 in FIG. 4, which will be described below) on the recordable large-capacity optical disk 90, it cannot be treated as the data of the whole of the recordable large-capacity optical disk 90 as it is. Accordingly, in the first embodiment, the necessary conversion processing is introduced.

Figure 4:
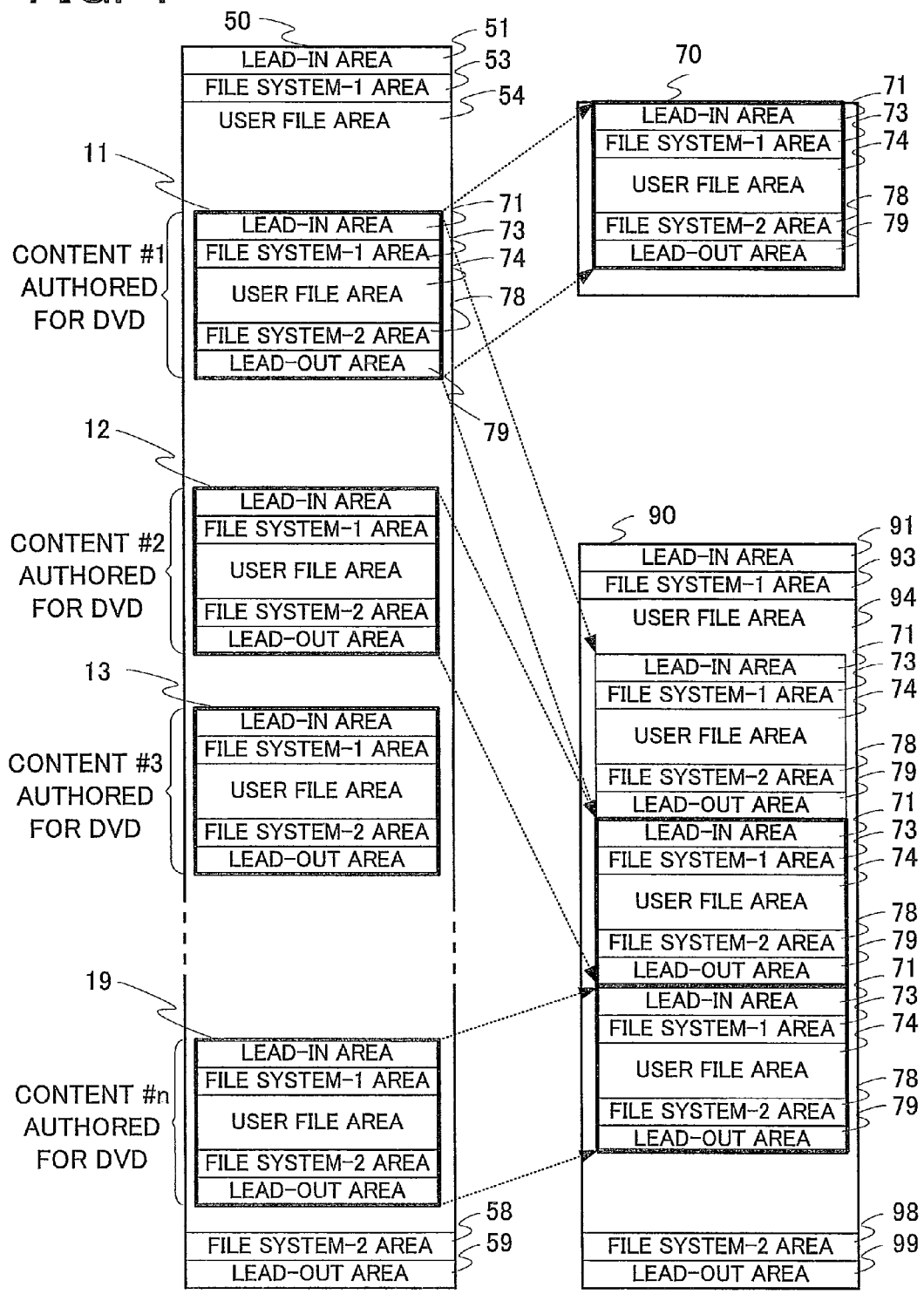
FIG. 4 is a diagram illustrating data location when the contents authored for DVD recorded on the hard disk are recorded on the recordable DVD or the recordable large-capacity optical disk in the information recording apparatus according to the first embodiment.

FIG. 4 is a diagram illustrating the data location when the contents authored for DVD recorded on the hard disk 50 are recorded on the recordable DVD 70 or the recordable large-capacity optical disk 90 in the information recording apparatus 3 according to the first embodiment. As illustrated in FIG. 4, the hard disk 50 includes a user file area 54, and also includes a lead-in area 51, a file system-1 area 53, a file system-2 area 58 and a lead-out area 59, which are provided for management of the hard disk 50 itself. The control means (a reference numeral 4 in FIG. 1) stores the information for accessing the hard disk 50 and the information for configuring a file system to be recorded on the hard disk 50 for user file management.

FIG. 4 illustrates a state in which n contents of from the content authored for DVD (#1) 11 to the content authored for DVD (#n) 19 are recorded in the user file area 54. Each of the recorded contents authored for DVD has the data structure illustrated in FIG. 3. Although the names of areas from the lead-in area 71 to the lead-out area 79 in each content authored for DVD indicates details in a format of the DVD, all of such data are data to be treated as the user data of the disk image recorded in the user file area 54 of the hard disk 50.

As illustrated in FIG. 4, when, for example, the content authored for DVD (#1) 11 is recorded from the hard disk 50 to the recordable DVD 70, the lead-in area 71, the file system-1 area 73, the user file area 74, the file system-2 area 78, and the lead-out area 79 on the disk image of the hard disk 50 are recorded at the locations on the disk format of the recordable DVD 70, where the lead-in area 71, the file system-1 area 73, the user file area 74, the file system-2 area 78, and the lead-out area 79 should be placed. As a result, the recordable DVD 70 becomes a disk in conformity with the disk format of the DVD and it can be reproduced by a DVD reproducing equipment.

As illustrated in FIG. 4, the recordable large-capacity optical disk 90 includes a lead-in area 91, a file system-1 area 93, a file system-2 area 98, and a lead-out area 99, which are placed for the purpose of management of the disk itself, in addition to a user file area 94. The control means (a reference numeral 4 in FIG. 1) stores the information for accessing the recordable large-capacity optical disk 90 and the information to be recorded on the recordable large-capacity optical disk 90. When the content authored for DVD (#1) 11, for example, is recorded from the hard disk 50 to the recordable large-capacity optical disk 90, all data of the disk image are recorded in the user file area 94 of the recordable large-capacity optical disk 90. The data of the disk image of the content authored for DVD (#2) 12 and the data of the disk image of the content authored for DVD (#n) 19 are also recorded in the user file area 94 of the recordable large-capacity optical disk 90 in a similar manner to the data of the disk image of the content authored for DVD (#1) 11.

Figure 5:
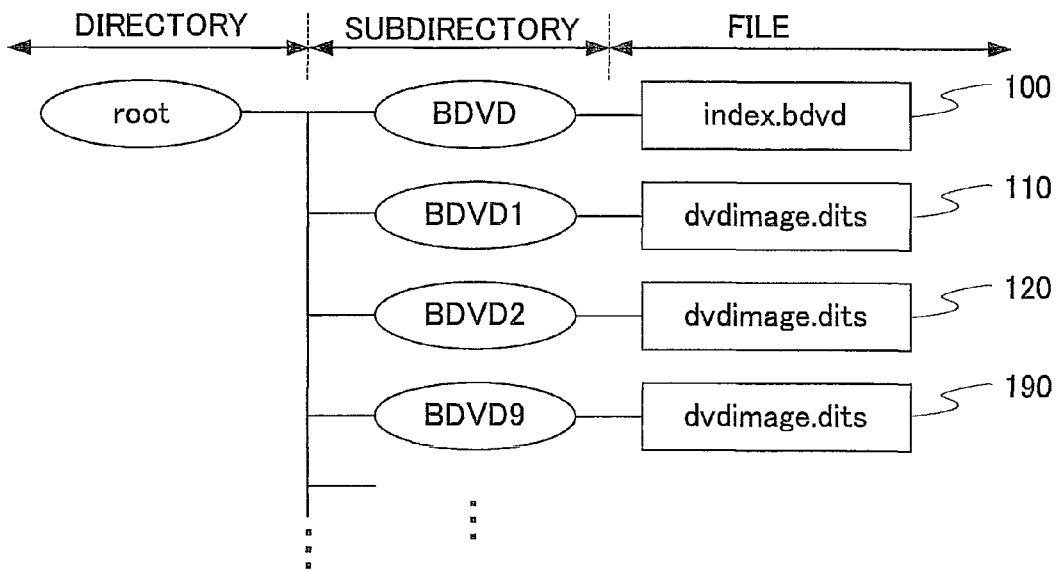
FIG. 5 is a diagram illustrating a configuration example of directories and a file structure in the user file area when the disk image data of the contents authored for DVD are recorded in the user file area of the hard disk or the recordable large-capacity optical disk in the information recording apparatus according to the first embodiment.

FIG. 5 is a diagram illustrating a configuration example of directories and a file structure in the user file area 54 or 94 when the disk image data of the content authored for DVD are recorded in the user file area 54 of the hard disk 50 or the user file area 94 of the recordable large-capacity optical disk 90 in the information recording apparatus 3 according to the first embodiment. As illustrated in FIG. 5, subdirectories for contents authored for DVD are provided under a root directory so that each of them can collect and store the data of each of the contents authored for DVD. A file "dvdimage.dits" 110 of the disk image data of the content authored for DVD (#1) 11 is located under a subdirectory "BDVD1", a file "dvdimage.dits" 120 of the disk image data of the content authored for DVD (#2) 12 is located under the subdirectory "BDVD2", and a file "dvdimage.dits" 190 of the disk image data of the content authored for DVD (#n) 19 is located under a subdirectory "BDVD9". Further, a subdirectory "BDVD" is the subdirectory containing an index information file "index.BDVD" 100 for managing the information regarding such items of the disk image data and the subdirectories containing them. The subdirectory "BDVD" is used for providing the information summarizing a status of recording of the contents when the user accesses the content authored for DVD stored on the recordable large-capacity optical disk 90.

Since the disk image files are treated as the data on the user file area 54 or 94 in any of the hard disk 50 and the recordable large-capacity optical disk 90, both of them can be caused to have the same file structure. When the contents authored for DVD are recorded from the hard disk 50 to the recordable large-capacity optical disk 90 by copying or moving, if the file structures are the same, the converting process when the recording is performed can be removed and therefore the process can be simplified. Although in the recordable large-capacity optical disk 90, its main object is to contain the content data and therefore an access route to such information is simplified by placing the subdirectories such as "BDVD", "BDVD1" and so on directly under the root directory, in the hard disk 50, the subdirectories such as "BDVD", "BDVD1" and so on directly can be collected and placed under another subdirectory in a hierarchy structure root directory for the convenience of design of the control means. If the file structures under the subdirectory are the same, the similar effects that the converting process when the recording is being performed can be removed, can be obtained.

Further, by providing the subdirectories "BDVD1", "BDVD2", . . . for the contents authored for DVD respectively, even when file names "dvdimage.dits" on each disk image data are the same, the files of the disk image can be dealt with, without changing the file names. When the content server 1 download-distributes the content authored for DVD to users, all of the contents authored for DVD can be distributed to any of the users as the disk image data with the same file name and it is not necessary to adjust the file names individually. As a result, the reproducing equipment for the large-capacity optical disk 90 can identify a subject file to be dealt with easily.

In FIG. 5, an example in which each disk image data is made by a single file has been illustrated. In this case, the disk image data in the file "dvdimage.dits" includes a set of image data of all disk areas from the lead-in area to the lead-out area in the content authored for DVD. Under the present circumstances, it is expected that the content server 1 prepares the contents authored for DVD for download distribution to a recordable DVD 70 as a main purpose. If the contents, designed by the present invention, for download distribution in conformity with the data format on the condition that distribution to the recordable large-capacity optical disk 90 is performed are not prepared, a recording method as illustrated in FIG. 5, that is, a method of collecting and recording a single content authored for DVD, that is, data for the content authored for DVD for a single disk can be used.

Figure 6:
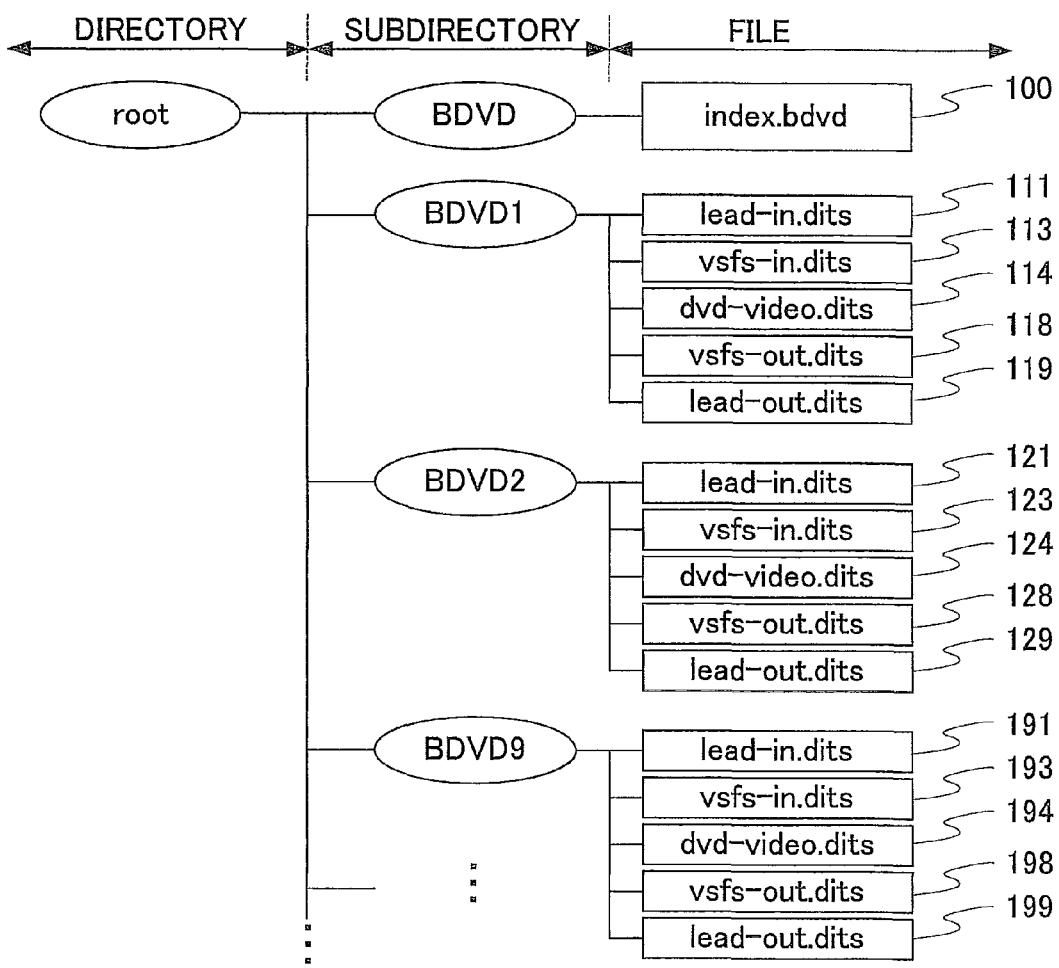
FIG. 6 is a diagram illustrating another configuration example of directories and a file structure in the user file area when the disk image data of the contents authored for DVD are recorded in the user file area of the hard disk or the recordable large-capacity optical disk in the information recording apparatus according to the first embodiment.

FIG. 6 is a diagram illustrating another configuration example of directories and a file structure in the user file area 54 or 94 when the disk image data of the content authored, for DVD are recorded in the user file area 54 of the hard disk 50 or the user file area 94 of the recordable large-capacity optical disk 90 in the information recording apparatus 3 according to the first embodiment. With regard to a point that the subdirectories "BDVD1", "BDVD2", "BDVD9", . . . are provided for each of the contents authored for DVD in order to collect and store data of the contents authored for DVD under the root directories respectively, the example illustrated in FIG. 6 is the same as the example illustrated in FIG. 5. Further, a subdirectory "BDVD" and an index information file "index.bdvd" 100 disposed under it, which are illustrated in FIG. 6, are the same as those illustrated in FIG. 5.

In the example shown in FIG. 6, the disk image data of the content authored for DVD (#1) 11 are placed under the subdirectory "BDVD1", but are divided into portions of the disk areas of the DVD. As shown in FIG. 6, the disk image data in the lead-in area 71 of the DVD are recorded in a file "lead-in.dits" 111, the disk image data in the file system-1 area 73 of the DVD are recorded in a file "vsfs-in.dits" 113, the disk image data in the user file area 74 of the DVD are recorded in a file "dvd-video.dits" 114, the disk image data in the file system-2 area 78 of the DVD are recorded in a file "vsfs-out.dits" 118, and the disk image data in the lead-out area 79 of the DVD are recorded in a file "lead-out.dits" 119.

Similarly, the disk image data of the content authored for DVD (#2) 12 are placed under the subdirectory "BDVD2", but are divided into portions of the disk areas of the DVD. The disk image data in the lead-in area 71 of the DVD are recorded in a file "lead-in.dits" 121, the disk image data in the file system-1 area 73 of the DVD are recorded in a file "vsfs-in.dits" 123, the disk image data in the user file area 74 of the DVD are recorded in a file "dvd-video.dits" 124, the disk image data in the file system-2 area 78 of the DVD are recorded in a file "vsfs-out.dits" 128, the disk image data in the lead-out area 79 of the DVD are recorded in a file "lead-out.dits" 129.

Similarly, the disk image data of the content authored for DVD (#n) 19 are placed under the subdirectory "BDVD9", but are divided into portions of the disk areas of the DVD. The disk image data in the lead-in area 71 of the DVD are recorded in a file "lead-in.dits" 191, the disk image data in the file system-1 area 73 of the DVD are recorded in a file "vsfs-in.dits" 193, the disk image data in the user file area 74 of the DVD are recorded in a file "dvd-video.dits" 194, the disk image data in the file system-2 area 78 of the DVD are recorded in a file "vsfs-out.dits" 198, and the disk image data in the lead-out area 79 of the DVD are recorded in a file "lead-out.dits" 199.

The areas existing on the recordable large-capacity optical disk 90 are different depending on a kind of the information to be accessed when the content authored for DVD (#1) 11 is being played. As described above, by dividing a file into portions of the areas, the access control for each kind of information becomes easy. In the example illustrated in FIG. 6, the detailed processing can be performed in units of a file so that at the time of start-up operation first the "lead-in.dits" 111 is read out to obtain only information necessary for accessing the content, next the "vsfs-in.dits" 113 and the "vsfs-out.dits" 118 are read out to obtain the access information to the file, if necessary the information to be referenced also during reproduction is kept in the memory 4a of the control means (a reference numeral 4 in FIG. 1) as it is, and next the "dvd-video.dits" 114 is read out in sequence to reproduce the content authored for DVD (#1). For this reason, the file management on the recordable large-capacity optical disk 90 becomes easy.

Furthermore, the disk image data of the content authored for DVD (#2) 12 or the content authored for DVD (#n) 19 are similar to the data of the content authored for DVD (#1) 11 which have been exemplified above.

Figure 7:
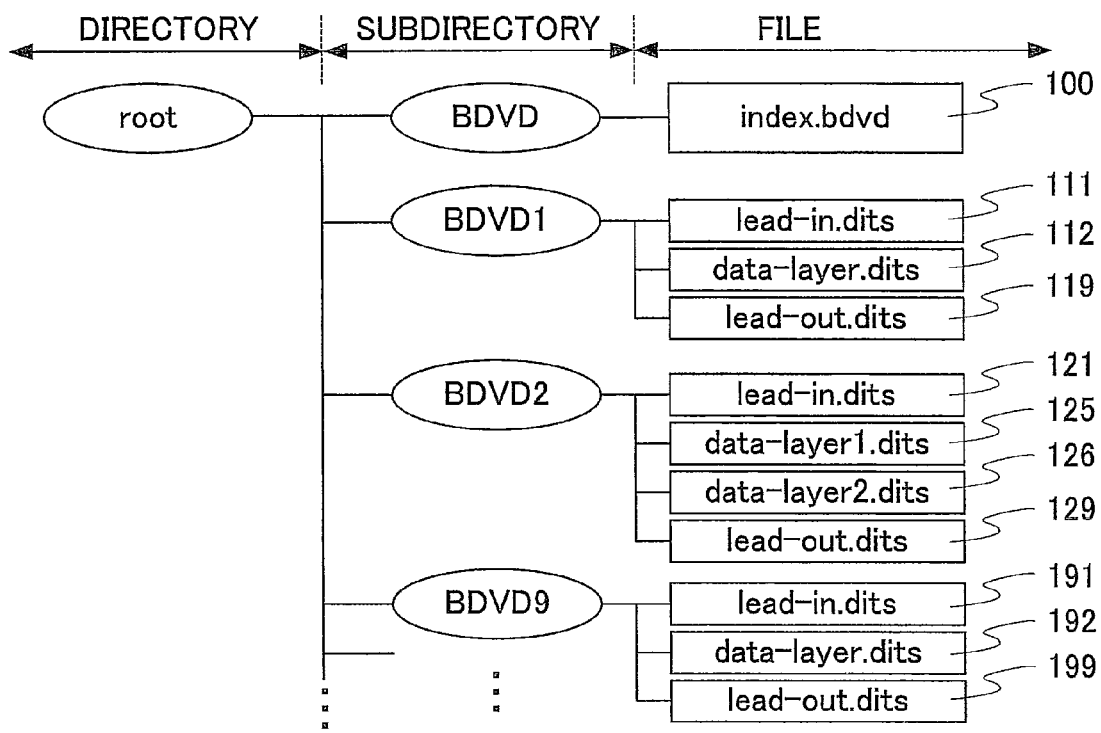
FIG. 7 is a diagram illustrating yet another configuration example of directories and a file structure in the user file area when the disk image data of the contents authored for DVD are recorded in the user file area of the hard disk or the recordable large-capacity optical disk in the information recording apparatus according to the first embodiment.

FIG. 7 is a diagram illustrating yet another configuration example of directories and a file structure in the user file area 54 or 94 when the disk image data of the content authored for DVD are recorded in the user file area 54 of the hard disk 50 or the user file area 94 of the recordable large-capacity optical disk 90 in the information recording apparatus 3 according to the first embodiment. In FIG. 7, parts that are the same as or correspond to parts shown in FIG. 6 are assigned the same reference numerals. A recording method illustrated in FIG. 7 is the same as that in the cases of FIG. 5 or FIG. 6 in a point that a subdirectory is provided for each DVD in order to contain data of the content authored for DVD under the root directory collectively for each DVD. Furthermore, a subdirectory "BDVD" and an index information file "index.bdvd" 100 disposed under it are the same as those in the case of FIG. 5.

In the example illustrated in FIG. 7, the disk image data of the content authored for DVD (#1) 11 are placed under the subdirectory "BDVD1", but a way of dividing in each disk area of the DVD is different from that in the case of FIG. 6. In the example illustrated in FIG. 7, the disk image data in the lead-in area 71 of the DVD are recorded in a file "lead-in.dits" 111, the disk image data in the data area 72 of the DVD are recorded in a file "data-layer.dits" 112, and the disk image data in the lead-out area 79 of the DVD are recorded in a file "lead-out.dits" 119.

In the example illustrated in FIG. 7, the detailed processing is not performed in units of a file in a similar manner to the example illustrated in FIG. 6, but the processing can be performed while the information necessary for start-up of a disk and the information necessary for reproduction of the content are distinguished. There exist two types as DVD types, that is, a single-layer disk including only a first recording layer as an information recording layer and a dual-layer disk including a first recording layer and a second recording layer as information recording layers. In the case of the single-layer disk, not only a record track but also an data area on the information recording layer are continuous from an inner circumference to an outer circumference, whereas in the dual-layer disk, a record track extends from an inner circumference to an outer circumference on the first recording layer of the optical disk, and thereafter jumps to the second recording layer of the disk and extends conversely from an outer circumference to an inner circumference on the second recording layer. Accordingly, the record track is interrupted in the near middle of the data area. Since the continuity of data is also interrupted here, the access control can be made easy by providing separate files so as to place their boundary here.

As illustrated in FIG. 7, an example where the disk image data of the content authored for DVD (#1) 11 are the contents to be contained in a single-layer disk of the DVD is illustrated. In contrast to this, an example where the disk image data of the content authored for DVD (#2) 12 are the contents to be contained in a dual-layer disk of the DVD. The disk image data are placed under the subdirectory "BDVD2", the disk image data of the data area 72 are divided into data for the first recording layer and data for the second recording layer, the disk image data of the data area 72 on the first recording layer are recorded in a file "data-layer1.dits" 125, and the disk image data of the data area 72 on the second recording layer are recorded in a file "data-layer2.dits" 126. By adopting thus way, the access control of the files of the disk image data separated for each recording layer of the disk becomes possible and therefore the management of the control information can be performed easily.

The detailed format of the disk image data will be described later. By introducing some scheme into terminal processing of a file "data-layer1.dits" 125 of the disk image data of data area 72 on the first recording layer and a file "data-layer2.dits" 126 of the disk image data of the data area 72 on the second recording layer, the access control to the content on the DVD image becomes easier. This is an advantage which can be obtained by dividing the disk image data of the data area 72 into the data on the first recording layer and the data on the second recording layer.

Next, copyright protection of the content will be described. With regard to a record medium for video content, importance is attached to copyright protection and the copyright protection technology specified by the standard are adopted. The content authored for DVD is protected by the copyright protection technology CSS, and a large-capacity optical disk is protected by the stronger copyright protection technology AACS. However, since a technology for invalidating or illegally deciphering the copyright protection is also being improved, even if the data of the content authored for DVD are protected by the copyright protection technology CSS, it is desirable that the data be protected doubly by adding the protection of the copyright protection technology AACS for a large-capacity optical disk. There are high needs of the content providers that when a plurality of the contents authored for DVD collected together are supplied as a single large-capacity optical disk, it is desirable that the protection be made using a stronger technology. When a plurality of the contents authored for DVD are downloaded to the information recording apparatus 3, they are recorded on the hard disk 50 one-by-one separately. Further, when they are recorded from the hard disk 50 to the recordable large-capacity optical disk 90, the recording is performed after the user specifies a desired content. At this time, it is convenient if the additional contents can be recorded later. Therefore, it is necessary that the copyright protection for a large-capacity optical disk should be adopted every time the content is recorded.

Figure 8:
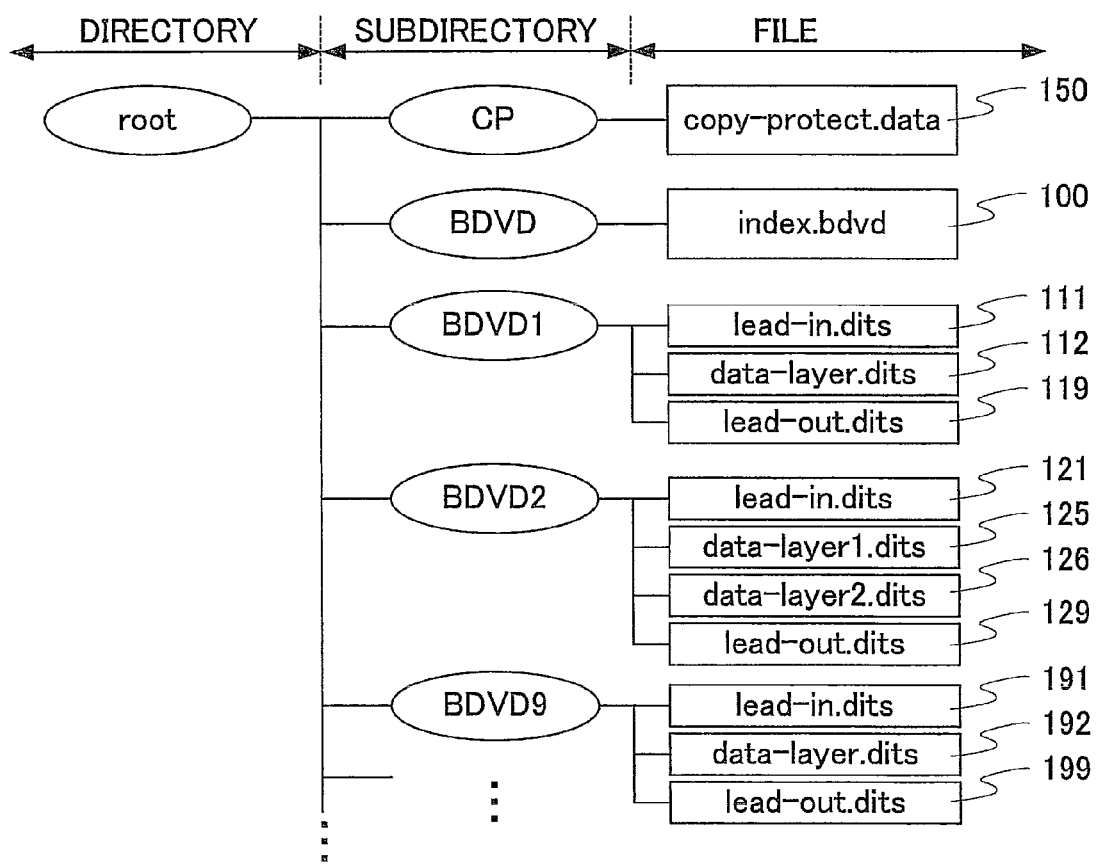
FIG. 8 is a diagram illustrating directories and a file structure in the information recording apparatus when the disk image data of the contents authored for DVD are copyright-protected and recorded in the user file area of the recordable large-capacity optical disk in the information recording apparatus according to the first embodiment.

FIG. 8 is a diagram illustrating directories and a file structure in the information recording apparatus when the disk image data of the content authored for DVD are copyright-protected and recorded in the user file area 94 on the recordable large-capacity optical disk 90 in the information recording apparatus according to the first embodiment. In FIG. 8, parts that are the same as or correspond to parts shown in FIG. 7 are assigned the same reference numerals. There is a plurality of files containing the information necessary for copyright protection, but in FIG. 8 these are collected to constitute a copyright protection information file group "copy-protect.data" 150, which is placed under the newly provided copyright protection information subdirectory "CP". The file of the disk image data of the content authored for DVD placed under the subdirectory "BDVDn" (n is an integer) is encrypted at the time or recording and decrypted at the time of reproducing, using the information of the copyright protection information file group "copy-protect.data" 150. At the time of reproducing, the CSS is decrypted and then the content authored for DVD is reproduced by the reproducing equipment and the reproducing software of the DVD.

When the contents authored for DVD are recorded from the hard disk 50 to the recordable large-capacity optical disk 90, once the encryption is released and thereafter the encryption processing for the recordable large-capacity optical disk 90 and the recording are performed by the optical disk device 60. Further, when the contents authored for DVD are recorded from the hard disk 50 to the recordable DVD 70, the encryption on the hard disk is released to keep only the CSS protection and then they are recorded on the recordable DVD 70 by the optical disk device 60. By this configuration, the recorded each content authored for DVD is treated as a single title with regard to a format of the recordable large-capacity optical disk in a similar manner to another content of the large-capacity optical disk content. Since the management of the contents is standardized, the system configuration and the management can be easy.

A description will be made below as to a method of recording the disk image data of the DVD on the recordable large-capacity optical disk 90 in units of the recording as efficiently as possible so that the access control to data becomes easy by packing.

Figure 9:
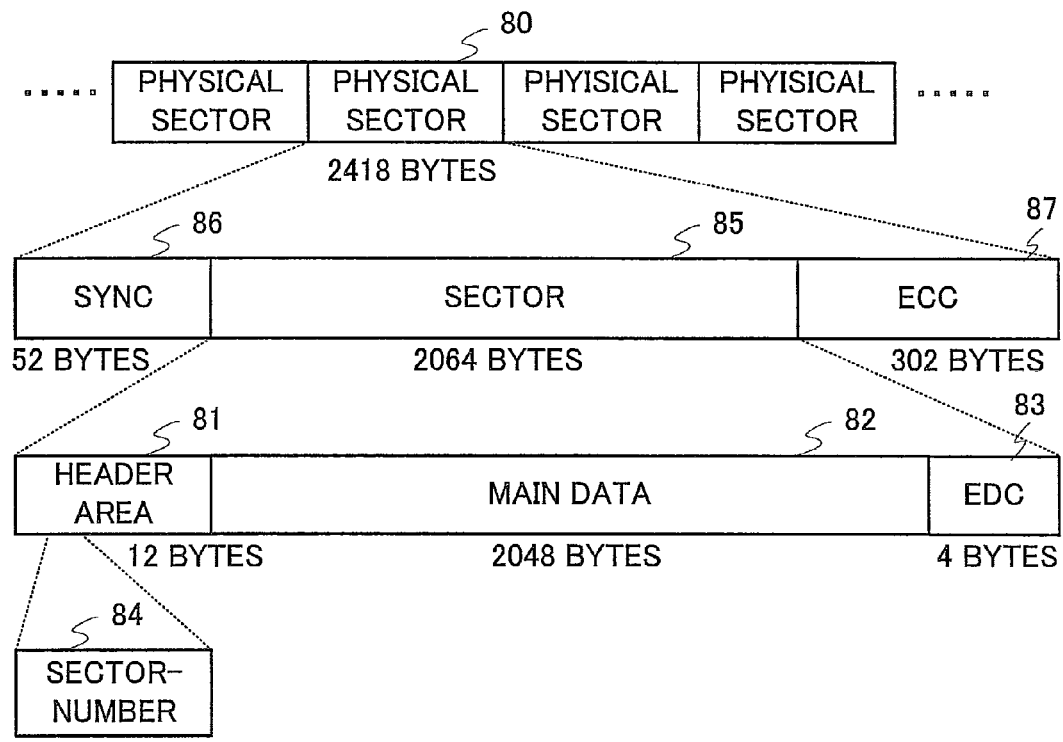
FIG. 9 is a diagram illustrating units of recording on the DVD.

FIG. 9 is a diagram illustrating units of the recording on the DVD. As illustrated in FIG. 9, a record track on the DVD is formed from continuously connected physical sectors 80. The physical sector 80 is composed of synchronization information (SYNC) 86, a sector 85, and an error correction code (ECC) 87. A part of meaningful data of the physical sector 80 is the sector 85. The sector 85 includes a 12-byte header area 81 as a leading portion thereof, succeeding 2048-byte main data 82, and further succeeding 4-byte error detection code (EDC) 83. A leading portion of the header area 81 contains a sector-number 84. A sector length of the sector 85 is 2064 bytes. In a general DVD, power-of-two-byte user data such as 512 bytes, 1024 bytes, or 2048 bytes are recorded in the sector which are units of the accessing for recording/reproducing. Furthermore, in both the DVD and the recordable large-capacity optical disk, a data frame length as units of the recording is 2048 bytes which is the same as that of the main data 82. In a use for normal data recording, the 2048-byte data which can be contained in the main data 82 are enough even for recording a user file on the DVD.

However, with regard to the content authored for DVD, the header area is used for the control information for improving access performance when the content is being played and improving access performance, such as smoothness at the fast-forwarding or fast-reversing, quickness of the skip or jump operation, and the quick search for a desired part when various kinds of special reproduction are performed, and is used for the information for encryption and decryption. The header area of the sector-number holds the information to be used for such purpose. Accordingly, as the disk image data of the content authored for DVD, the whole of 2064-byte sector length of the DVD has to be recorded on the recordable large-capacity optical disk.

Further, in the actual physical sector 80 on DVD, the 52-byte synchronization information (SYNC) 86 and the 302-byte error correction code (ECC) 87 are added to the 2064-byte sector 85, thereby constituting the 2418-byte physical sector 80. When the disk image data of the content authored for DVD are dealt as the user data on the hard disk 50 or the recordable large-capacity optical disk 70, the large-sized synchronization information and the error correction code are not necessary, and it is possible that these are added by the optical disk device when the recording is performed. Accordingly, in this example, only data of the 2064-byte sector 85 excluding those are recorded. For this reason, the recording capacity for the disk image data can be saved at approximately 15%.

In the recordable large-capacity optical disk 90, when the content data on the application layer dealing with the video data and the audio data are accessed, the 188-byte packet are used as a minimal unit of the data. The compression of the video data and the processing of the compressed data stream are based on the MPEG2 standard, and the minimal unit of the data used at this time is the 188-byte packet. In the present invention, since this packet is used for the data management and the content to be handled can be dealt with consistently throughout the whole recording/reproducing system, the system is simplified.

Figure 10:
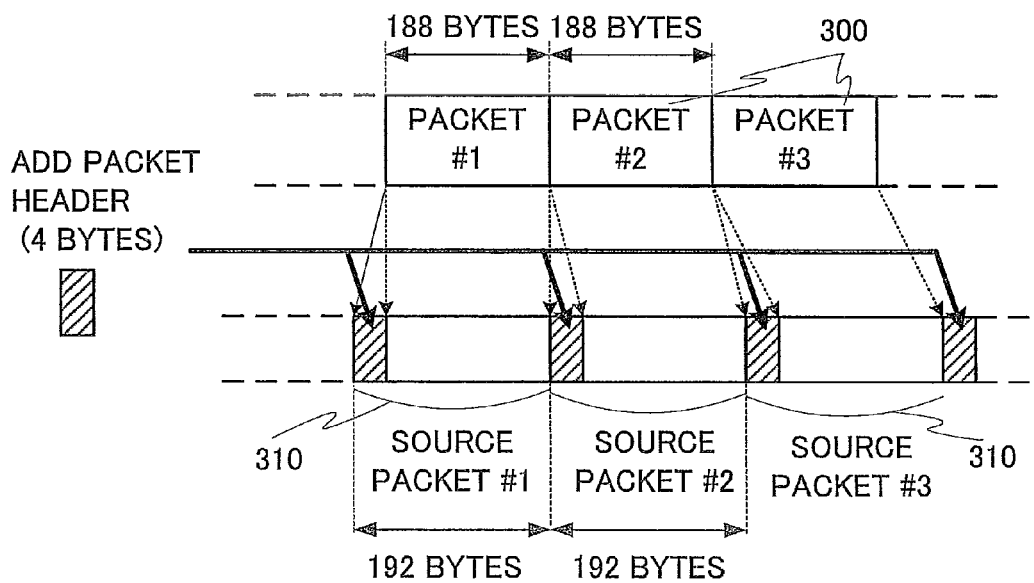
FIG. 10 is a diagram illustrating structure of source packets.

FIG. 10 is a diagram illustrating a structure of the source packets 310, which are formed by adding a packet header as packet management information to each packet 300 of a transport stream. As illustrated in FIG. 10, a packet header contains a number which makes it possible to arrange the packets in order of an original state even if their order is changed. Further, by adding the 4-byte packet header to the 188-byte packet to form 192 bytes, alignment using a unit smaller than the 2048-byte sector as units of the recording on a disk can be implemented. This is also applied to a format of the recordable large-capacity optical disk.

A description will be made as to a method of arrangement which can bring a sector of the DVD close to the units of the accessing on the recordable large-capacity optical disk as closer as possible. By setting in conformity with a predetermined rule so that a boundary of the sectors of the content data authored for DVD included in the disk image file matches the units of the accessing on the recordable large-capacity optical disk in which the disk image file is to be written, an access to a target sector containing the content data authored for DVD can be easy when the recordable large-capacity optical disk is being played by a reproducing equipment.

Figure 11:
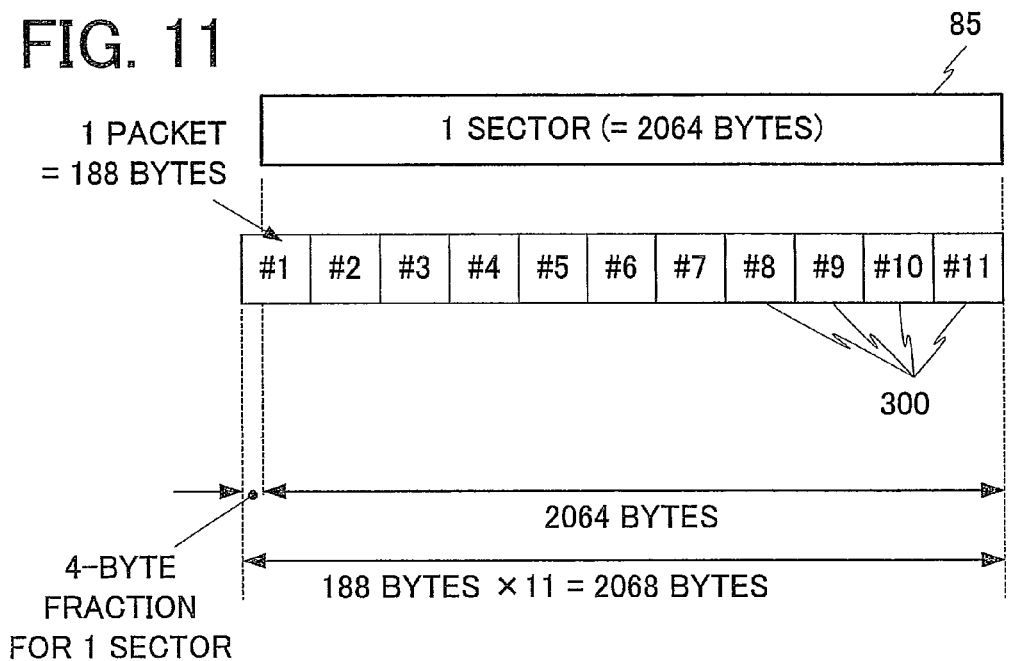
FIG. 11 is a diagram for explaining operation of the information recording apparatus according to the first embodiment and illustrates a process for storing the data of the 2064-byte sector in 11 packets.

FIG. 11 is a diagram illustrating processing for storing data of the 2064-byte sector 85 in 11 packets 300. As illustrated in FIG. 11, if the 2064-byte data composed of 1 sector are stored in 2068 bytes which are composed of 11 packets, the 4-byte fraction occurs.

Figure 12:
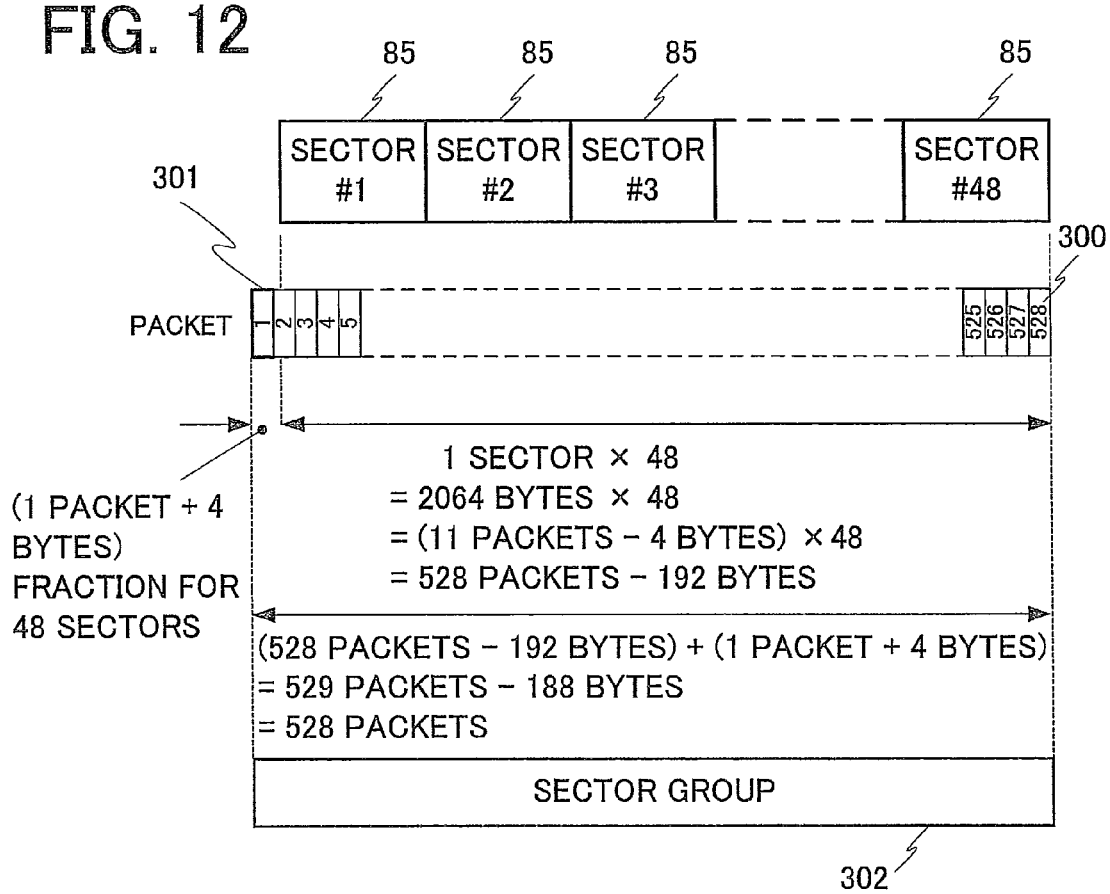
FIG. 12 is a diagram for explaining operation of the information recording apparatus according to the first embodiment and illustrates a process for storing 48-sector data in the packets.

FIG. 12 is a diagram illustrating a process for storing the 48-sector data in the packets 300. As illustrated in FIG. 12, if the 48-sector data are arranged with no space between them and the 48-sector data are contained in 528 packets, the (1 packet+4 bytes) fraction occurs. If the 96-sector data are contained in 1056 packets which is twice as large as 528 packets, the (2 packets+8 bytes) fraction occurs. In the DVD format, if 16 sectors are collected to form an ECC block and the units of the accessing are set to an integer multiple of 16 sectors, the random accessing becomes easy. The fraction is subjected to the padding processing at a leading portion of 528 packets or 1056 packets. The packets, the leading portion of which is subjected to the padding are used as a control packet 301 containing the control information such as access information. In FIG. 12, a unit, to which the control packet 301 is added, is set to 48 sectors, and a unit including these 48 sectors (a unit composed of 528 packets) is referred to as a sector group 302.

Figure 13:
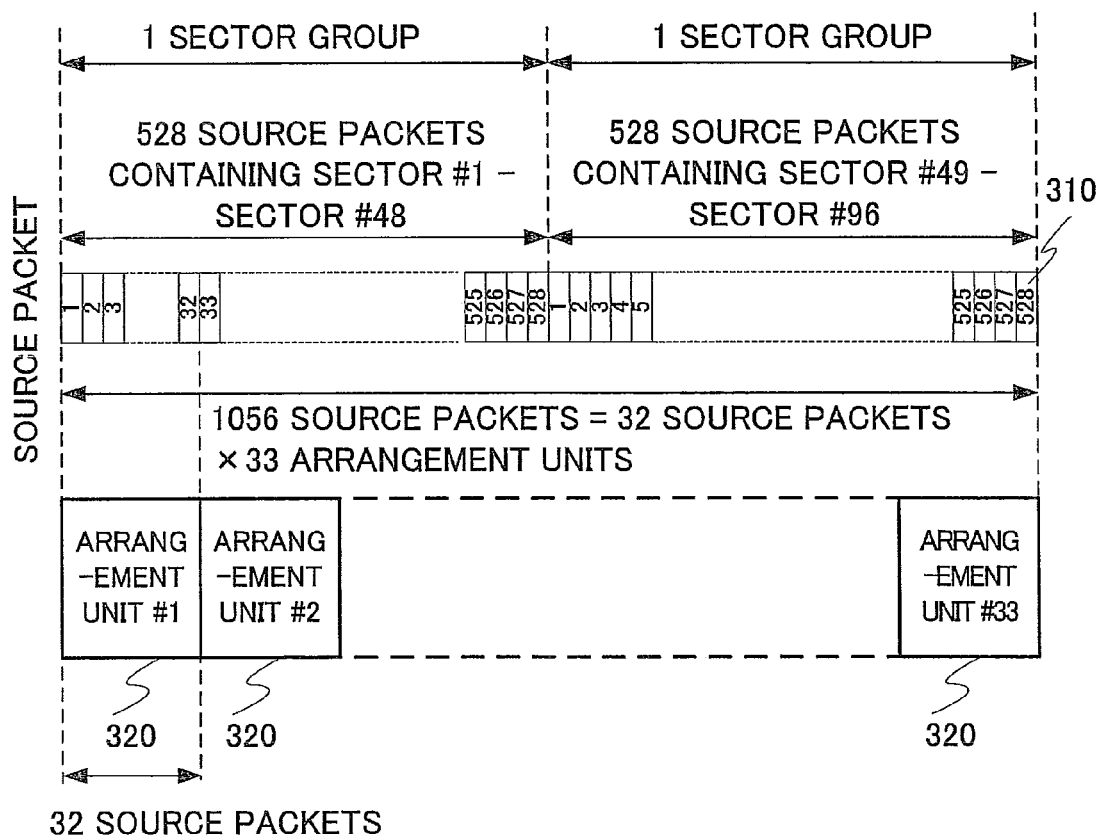
FIG. 13 is a diagram for explaining operation of the information recording apparatus according to the first embodiment and illustrates an example in which 32 source packets constitute 1 arrangement unit.

FIG. 13 is a diagram illustrating a case where 32 source packets 310 constitute 1 arrangement unit 320. As illustrated in FIG. 13, 1056 source packets composed of 96-sector data constitute 33 arrangement units. The arrangement unit 320 is a unit for simplifying the access control by causing a boundary of the sectors to coincide with a boundary of the source packets 310 at minimal intervals when the data are recorded in a sector of the recordable large-capacity optical disk 90. By setting a size of the arrangement unit 320 as described above, 1 arrangement unit becomes 6144 bytes, and can be caused to coincide with 3 sectors on the recordable large-capacity optical disk having a sector size of 2048 bytes.

Figure 14:
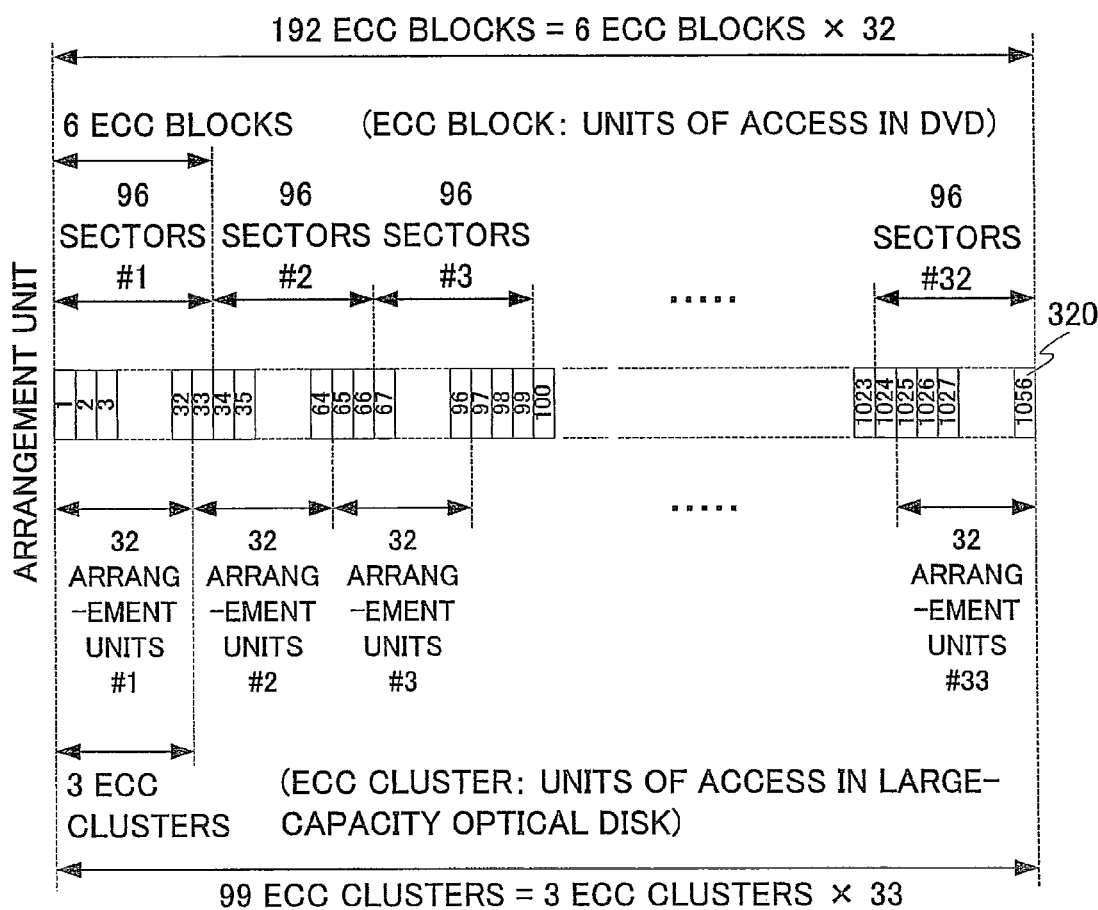
FIG. 14 is a diagram for explaining operation of the information recording apparatus according to the first embodiment and illustrates a relationship among the arrangement units, the ECC blocks of the DVD, and the ECC clusters on the recordable large-capacity optical disk.

FIG. 14 is a diagram illustrating a relationship among the arrangement units 320, the ECC blocks of the DVD, and the ECC clusters on the recordable large-capacity optical disk. A minimal unit for accessing the disk image data of the DVD is the 2048-byte sector, and 16 sectors constitute the ECC block as a unit of the error correction. Further, in the recordable large-capacity optical disk 90, a minimal unit for accessing on the disk is also the 2048-byte sector, but 32 sectors constitute the ECC cluster as a unit of the error correction. Since data have to be read from any of the disks after the error correction processing, the ECC block and the ECC cluster are used as units of the accessing when the apparatus is operating. It is desirable that the access control be simplified by causing a boundary of the ECC blocks to coincide with a boundary of the ECC clusters at minimal intervals. For this reason, considering that 1 arrangement unit coincides with 3 sectors on the recordable large-capacity optical disk and 32 sectors constitute an ECC cluster, 32 arrangement units are used as a unit. As a result, 32 arrangement units correspond to 3 ECC clusters.

As illustrated in FIG. 14, a boundary of the ECC blocks coincides with a boundary of the ECC clusters in units of 32 sets of 6 ECC blocks composed of 96 sectors, that is, a set of 192 ECC blocks (3072 sectors) in the DVD, which correspond to 33 sets of 3 ECC clusters composed of 32 arrangement units, that is, a set of 99 ECC clusters (3168 sectors) in the recordable large-capacity optical disk. Here, 6,340,608-byte disk image data of the content authored for DVD are stored, and a size of the user data including a fraction and a packet header of the packet becomes 6,488,064 bytes on a recordable large-capacity optical disk 90.

As described above, since a relationship that makes it possible to perform the conversion using an integer ratio where 192 ECC blocks of the content authored for DVD correspond to 99 ECC clusters on the recordable large-capacity optical disk 90 can be created, in order to calculate a correspondence between a sector to be accessed specified when the content authored for DVD is being played and a source packet on the recordable large-capacity optical disk 90 when the content authored for DVD recorded on the recordable large-capacity optical disk 90 is being played, the address calculation required for accessing becomes easy. If the data rate when the content is being played is 10 Mbits per second, approximately 6 Mbytes of data correspond to about 5 seconds of video. This period of time is within an appropriate range as a temporal resolution at the time of accessing. Further, since the data can be read out independently in units of the ECC cluster, it is easy to access with higher accuracy. For brevity of description, the packing scheme illustrated in FIG. 12 to FIG. 14 will be hereinafter referred to as "48-sector mode".

Next, another method for packing and then recording the disk image data of the DVD on the recordable large-capacity optical disk 90 will be described. A case where the most effective allocation is adopted on the basis of the units of the recording on the recordable large-capacity optical disk will be described. This is the case where the information for accessing data on the recordable large-capacity optical disk 90 is omitted. As has been illustrated in FIG. 11, when the data of the 2064-byte sector length are stored in the packets, the 2064-byte data as 1 sector are stored in 2068 bytes composed of 11 packets and the 4-byte fraction occurs.

Figure 15:
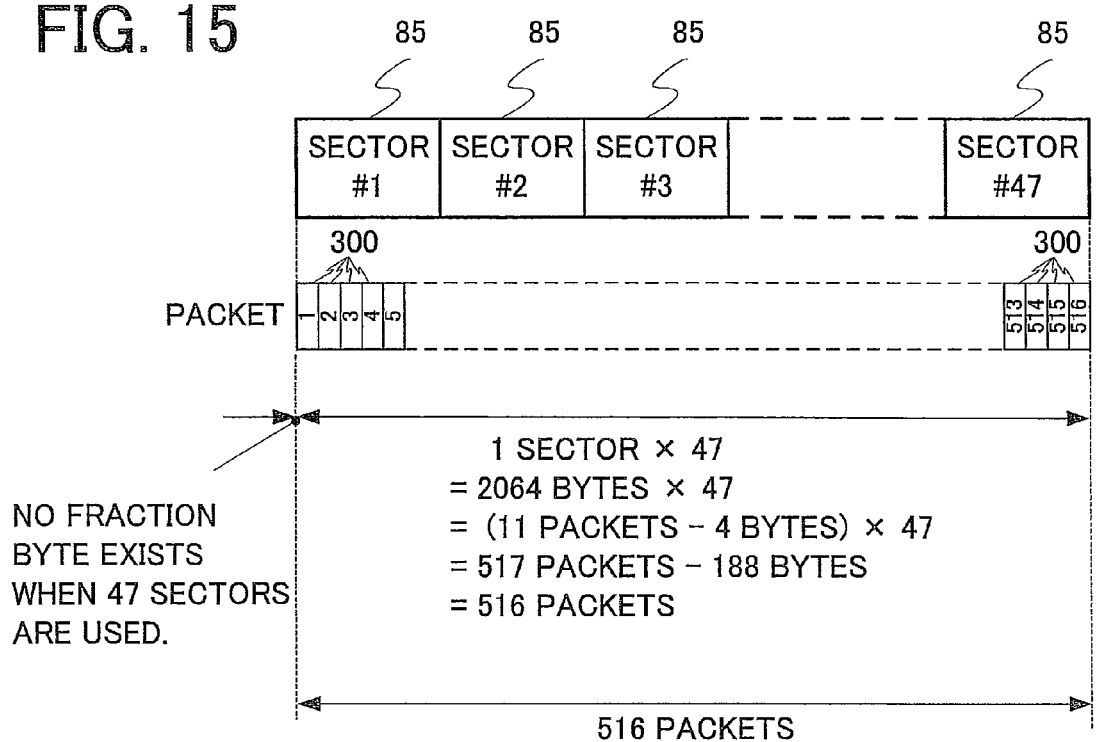
FIG. 15 is a diagram for explaining operation of the information recording apparatus according to the first embodiment and illustrates a case where 47-sector data are contained in 516 packets.

FIG. 15 is a diagram illustrating a case where the 47-sector data are stored in 516 packets. In FIG. 15, a reference numeral 85 denotes a single sector, and a reference numeral 300 denotes a single packet. As illustrated in FIG. 15, if the 47-sector data are packed closely, they can be stored in 516 packets with no fraction.

Figure 16:
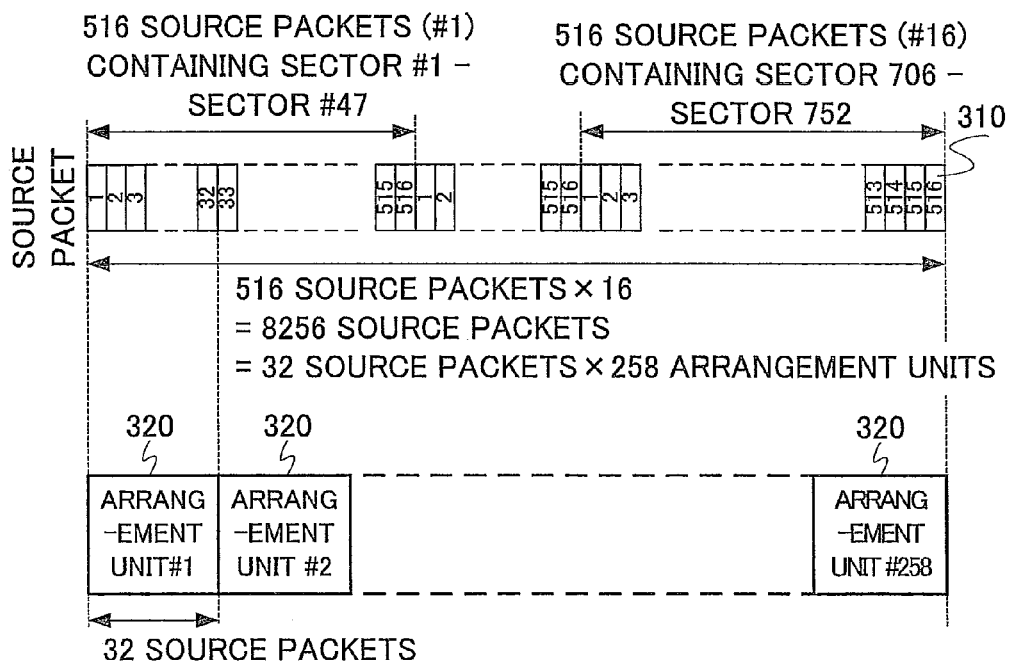
FIG. 16 is a diagram for explaining operation of the information recording apparatus according to the first embodiment and illustrates an example in which 32 source packets constitute 1 arrangement unit.

FIG. 16 is a diagram illustrating a configuration example in which 32 source packets constitute 1 arrangement unit. As illustrated in FIG. 16, in the case where 32 source packets constitute 1 arrangement unit, 8256 source packets, which are formed by collecting 16 sets of the 47-sector source packets (516 source packets), correspond to 258 arrangement units.

Figure 17:
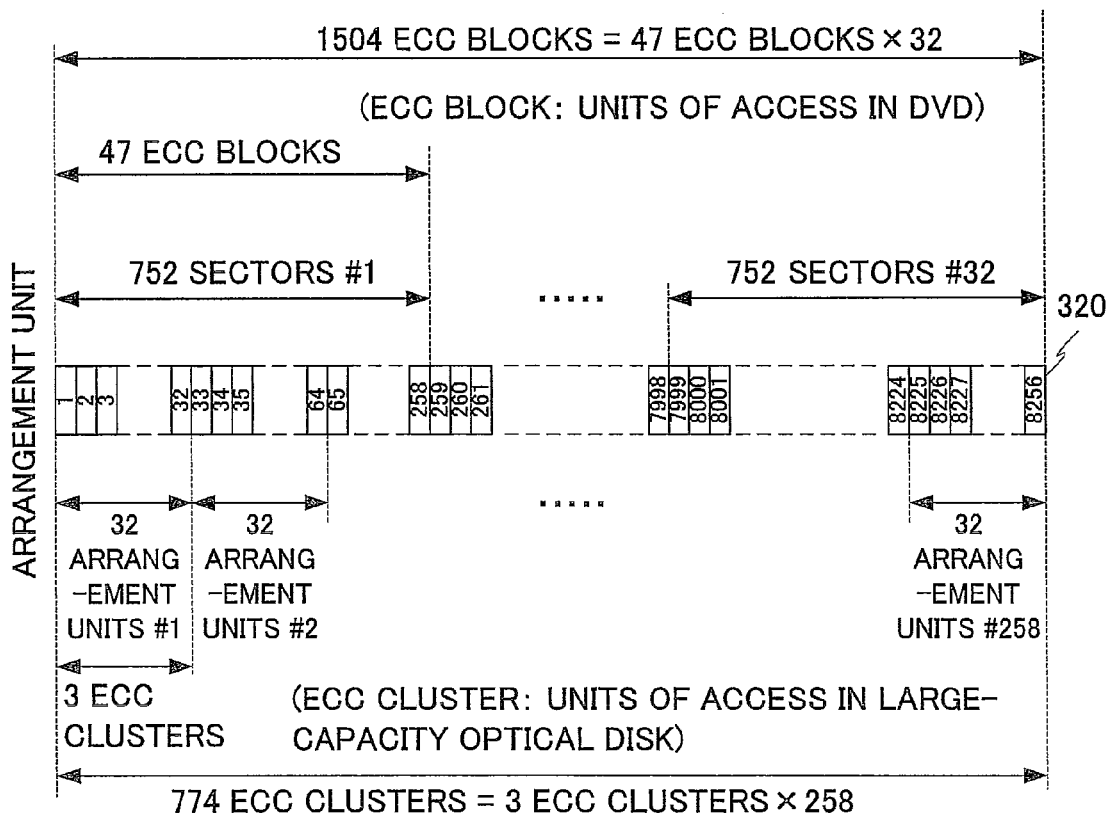
FIG. 17 is a diagram for explaining operation of the information recording apparatus according to the first embodiment and illustrates a relationship among the arrangement units, the ECC blocks of the DVD, and the ECC clusters on the recordable large-capacity optical disk.

FIG. 17 is a diagram illustrating a relationship among the arrangement units 320, the ECC blocks of the DVD, and the ECC clusters of the recordable large-capacity optical disk. As illustrated in FIG. 17, 32 sets of 47 ECC blocks composed of 752 sectors, that is, a set of 1504 ECC blocks (24064 sectors) of the DVD, is used as a unit which can cause a boundary of the ECC blocks to coincide with a boundary of the ECC clusters and corresponds to 258 sets of 3 ECC clusters composed of 32 arrangement units, that is, a set of 774 ECC clusters (24768 sectors) of the recordable large-capacity optical disk. The 49,668,096-byte disk image data of the content authored for DVD are stored there, and in the recordable large-capacity optical disk 90, a size of the user data including a fraction of the packet and a packet header is 50,724,864 bytes.

As described above, when a relationship between an access target sector which is indicated when the content authored for DVD is being played and a source packet on the recordable large-capacity optical disk is calculated for reproducing the content authored for DVD recorded on the recordable large-capacity optical disk 90, we can obtain the relationship that can make it possible to perform a conversion using an integer ratio in which 1504 ECC blocks of the content authored for DVD correspond to 774 ECC clusters on the recordable large-capacity optical disk 90. Since no padding packets are used, the address calculation required for accessing becomes easy. If a data rate when the content is being played is 10 Mbits per second, the above-described approximately 50 Mbytes of data correspond to the images for about 40 seconds. This is a case where the temporal resolution at the time of accessing is coarse in comparison with the above-described example of FIG. 14, but is within usable range, and it is possible to read out data independently in units of the ECC clusters to access with higher time accuracy. For brevity of description, a packing scheme illustrated in FIG. 16 and FIG. 17 will be hereinafter referred to as "47-sector mode".

An advantage of the packing by the 47-sector mode is that the load on a side of the content server can be reduced. With regard to a format of the disk image data, it is expected that the content server first prepares contents for the main purpose of download distribution to DVDs at early stage, and in this case, the data subjected to the packing by the above-described 48-sector mode are rarely download distributed. In such case, if the 47-sector mode where the padding packet with the DVD sector location table need not to be added is adopted, there is no need of the format conversion processing and it is enough to perform the packing processing to the disk image data of the original content authored for DVD, and therefore it is expected that the content server can support easily and the introduction is accelerated.

A detail structure of each file will be described below with reference to an example of a file structure of the disk image data illustrated in FIG. 7. Since it is easy to understand the case of the single-layer disk if the case of the dual-layer disk has been described, the content authored for DVD (#2) 12 of the dual-layer disk will be described.

Figure 18:
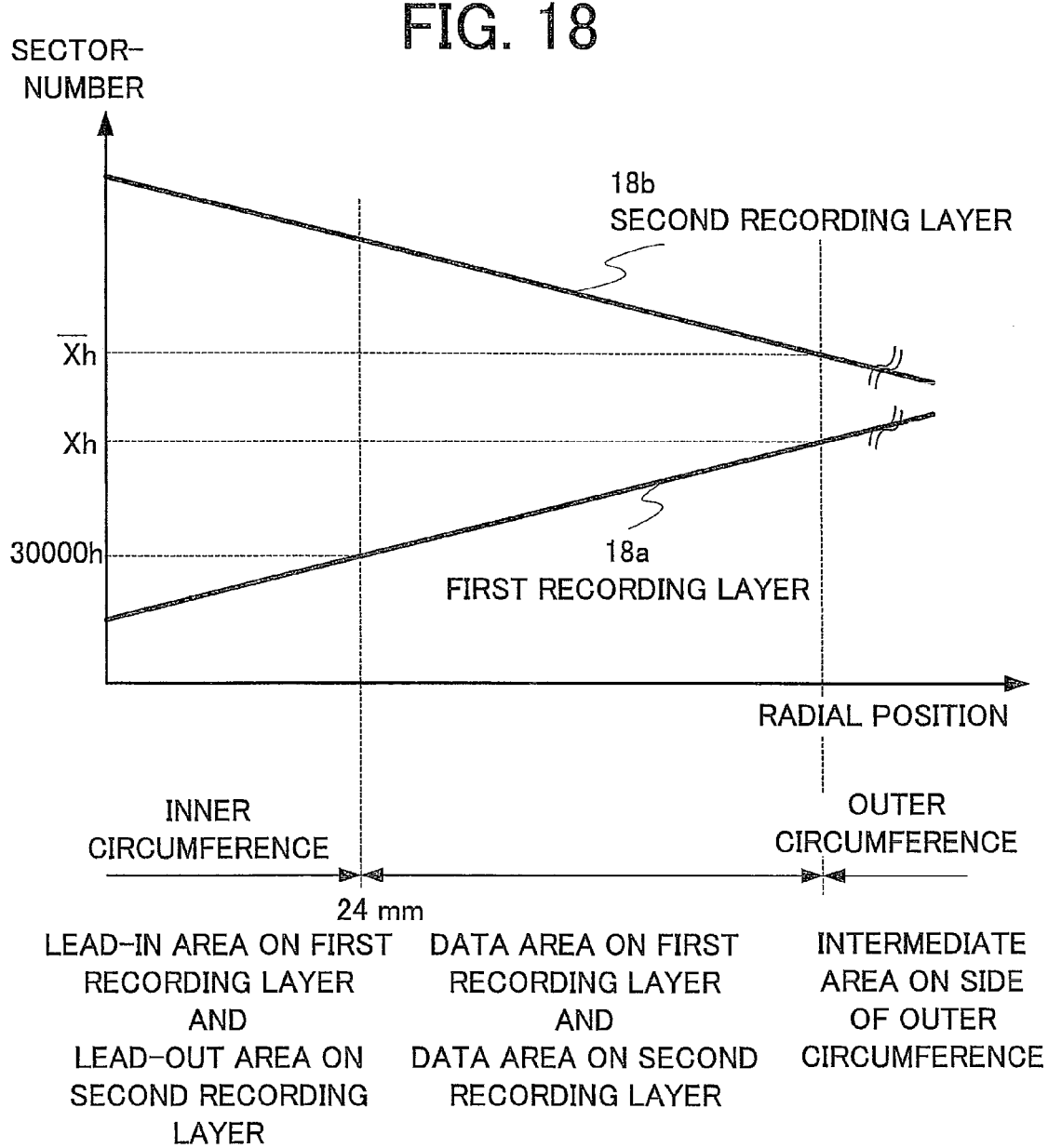
FIG. 18 is a diagram for explaining operation of the information recording apparatus according to the first embodiment and illustrates a relationship between each area of a dual-layer DVD having a first recording layer and a second recording layer and the sector-number.

FIG. 18 is a diagram illustrating a relationship between each area of the dual-layer DVD having a first recording layer and a second recording layer and a sector-number. In FIG. 18, a horizontal axis denotes a radial direction of the DVD and a vertical axis denotes a sector-number (hexadecimal number notation). As shown in FIG. 18 as a straight line 18a, a record track on the first recording layer of the dual-layer DVD begins from a lead-in area on a side of an inner circumference in a radial direction. A data area is arranged so that a sector on the record track at a radius of 24 mm on the first recording layer of the dual-layer DVD becomes 30000h when the sector-numbers are assigned in an ascending order and this sector becomes a leading sector of the data area. Here, "h" means a hexadecimal number. The record track on the first recording layer as the data area leads to a side of the outer circumference, the data area is interrupted in the vicinity of an edge of the outer circumference and an intermediate area begins. A sector-number of an ending sector of the data area on the first recording layer is denoted by Xh. Xh is described in the control information on the lead-in area. An interrupted radial position on the data area is continued to a record track on the second recording layer. As illustrated in FIG. 18 as a straight line 18b, a sector-number of a leading sector of the data area on the second recording layer is $\overline{X}h$, which is a complement number obtained by inverting each of bit values of Xh, and this sector becomes a leading portion of the ECC block. The record track on the second recording layer as the data area is continued to a side of the inner circumstance, the data area terminates in the vicinity of an edge of the inner circumstance and a lead-out area begins. The content authored for DVD to be downloaded is the disk image data including the sectors having the sector-numbers shown in FIG. 18.

Figure 19:
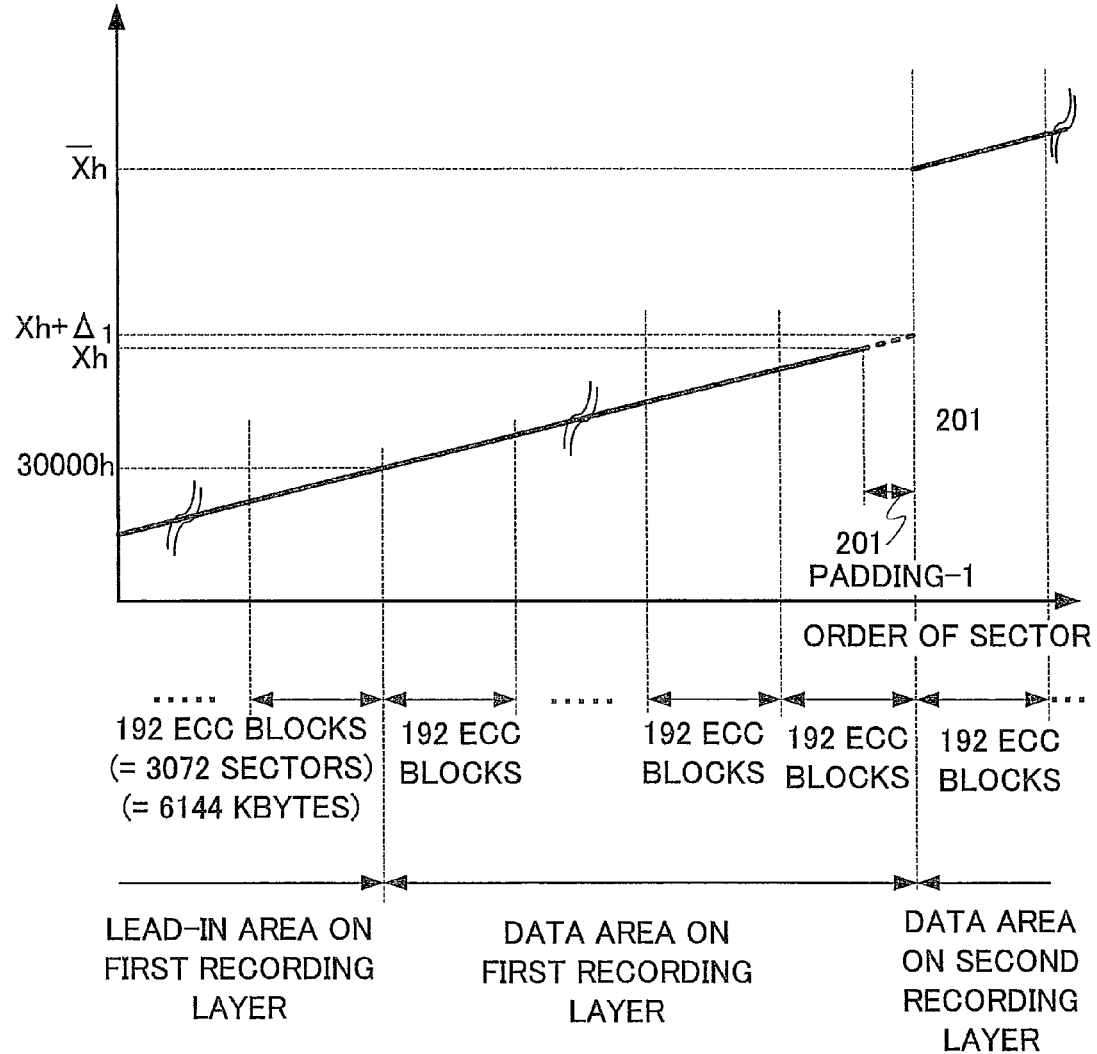
FIG. 19 is a diagram for explaining operation of the information recording apparatus according to the first embodiment and illustrates an example of the data recorded in each file of the disk image data.

FIG. 19 is a diagram for explaining operation of the information recording apparatus 3 according to the first embodiment and illustrates an example of data recorded in each file of the disk image data. In FIG. 19, a horizontal axis denotes an order of the arrangement of the sectors, and a vertical axis denotes a sector-number assigned to each sector. Although FIG. 19 shows an example when the packing is performed at the 48-sector mode (FIG. 12), the packing can be performed at the 47-sector mode (FIG. 15).

The data in a part described as "data in lead-in area" in FIG. 19 are data of the file "lead-in.dits" 121 shown in FIG. 7. Such data are data in units of 192 ECC blocks, and are in alignment with a boundary of the ECC clusters which are units of accessing on the recordable large-capacity optical disk. The data at the lead-in area of the DVD is specified by the DVD standard and includes meaningful data only at 256 ECC blocks from an ending portion, and the data at a part before them are all set to zero. Accordingly, the data in the file "lead-in.dits" 121 may be located so that the ending portion is in alignment with a boundary of the ECC clusters and a leading portion is in alignment with a boundary of the ECC clusters, while it secures a length specified by the DVD standard. Furthermore, the data in the file "lead-in.dits" 121 may be located so that the ending portion is not in alignment with a boundary of the ECC clusters and be added by an appropriate length of padding, while it secures a length specified by the DVD standard.

The data in a part described by "data on first recording layer" in FIG. 19 is data in the file "data-layer1.dits" 125 shown in FIG. 7. A leading portion of this data is a leading sector of the sector-number 30000h, and is in alignment with a boundary of the ECC clusters, the subsequent data are arranged so that the units of 192 ECC blocks as the units of the accessing on the recordable large-capacity optical disk is in alignment with a boundary of the ECC clusters. If a sector of the sector-number Xh at an ending portion of the data cannot be in alignment with a boundary of the ECC clusters, the padding data shown as "padding-1" 201 in the figure is inserted to make a full length of the data an integer multiple of 192 ECC blocks, that is, an integer multiple of 99 ECC clusters in the recordable large-capacity optical disk so that the boundaries of both are in alignment. The number of sectors corresponding to the "padding-1" 201 is $\Delta_1$ sectors as shown in FIG. 19. Further, as shown in FIG. 19, a sector-number of an ending sector of the "padding-1" 201 is (Xh+$\Delta_1$).

In FIG. 19, the data in a part described as "data area on second recording layer" are data of the file "data-layer2.dits" 126 shown in FIG. 7. A leading portion of such data is a sector of a sector-number $\overline{X}h$, and is in alignment with a boundary of the ECC clusters in this example. The subsequent data are arranged so that the units of 192 ECC blocks are in alignment with a boundary of the ECC clusters in a similar manner to the first recording layer. By adopting such configuration, a leading portion of a file can be started as meaningful data.

Figure 20:
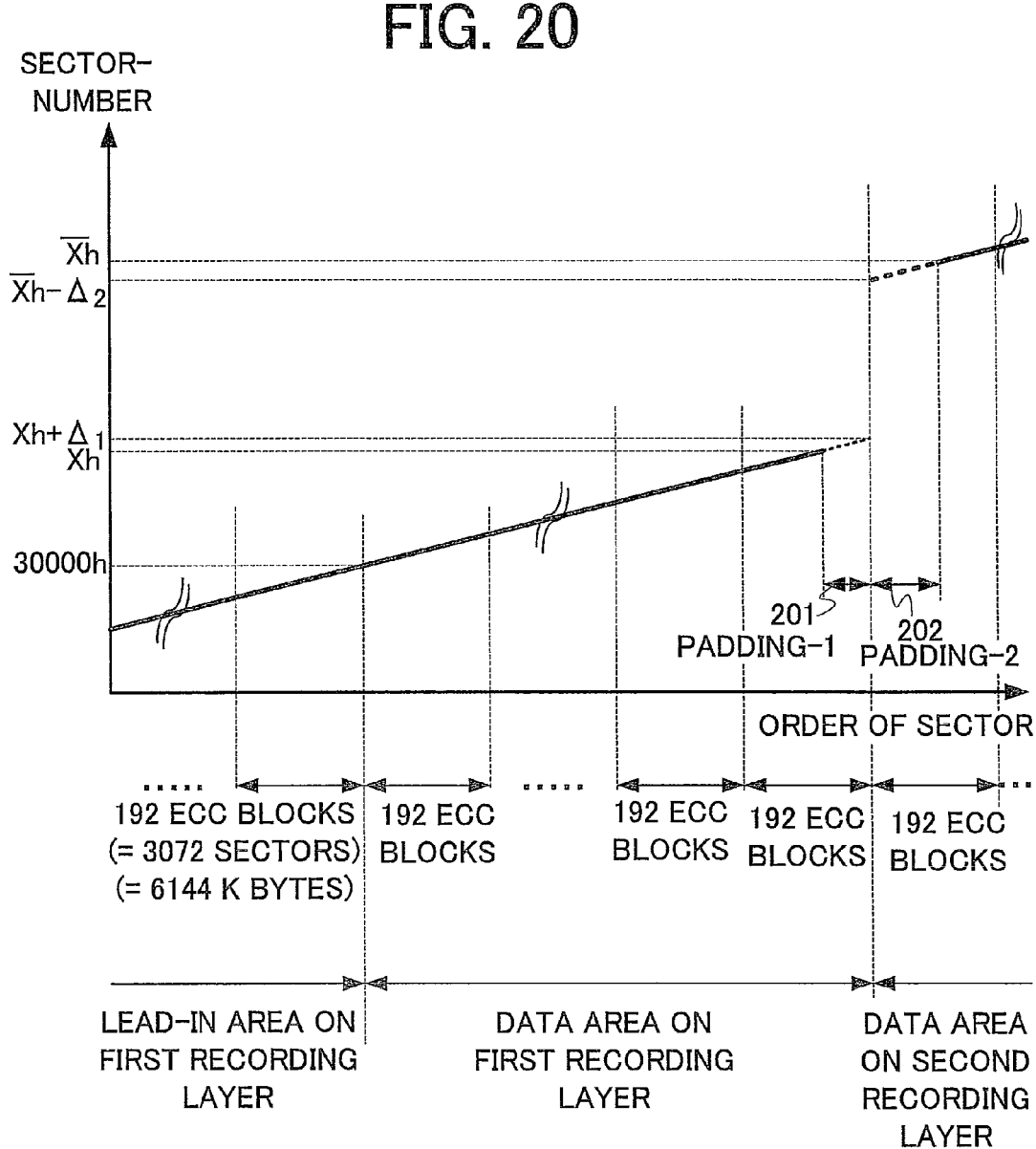
FIG. 20 is a diagram for explaining operation of the information recording apparatus according to the first embodiment and illustrates another example of the data recorded in each file of the disk image data.

FIG. 20 is a diagram illustrating another example of data recorded in each file of the disk image data. In FIG. 20, a horizontal axis denotes an order of the arrangement of the sectors, and a horizontal axis denotes a sector-number assigned to each sector. Although FIG. 20 shows an example when the packing is performed by the 48-sector mode (FIG. 12), the packing may be performed by the 47-sector mode (FIG. 15). In FIG. 20, the padding data are inserted before a sector of a sector-number $\overline{X}h$ as a leading portion of a meaningful sector in the file "data-layer2.dits" 126 of data of the data area on the second recording layer. The number of sectors corresponding to the "padding-2" 202 is $\Delta_2$ sectors as shown in FIG. 20. As described above, by adjusting a sector-number of a leading sector of the data area on the second recording layer so as to have an offset, that is, to be a multiple of 192 ($\overline{X}h-\Delta_2$), a leading sector of the disk image data can be the ECC block which can be in alignment with a boundary of the ECC clusters. By adopting the configuration shown in FIG. 20, the calculation for obtaining a position of the ECC cluster containing a sector from its sector-number can be simplified.

The sector-number 30000h of the leading sector of the data area on the first recording layer is a multiple of 192 (i.e., C0h). If the sector-number of the leading sector of the data area on the second recording layer is also set to a multiple of 192 ($\overline{X}h-\Delta_2$), the management of the sector position on both recording layers can be implemented by the common calculating method and therefore the access control can be easy. The calculating method will be described later.

Figure 21:
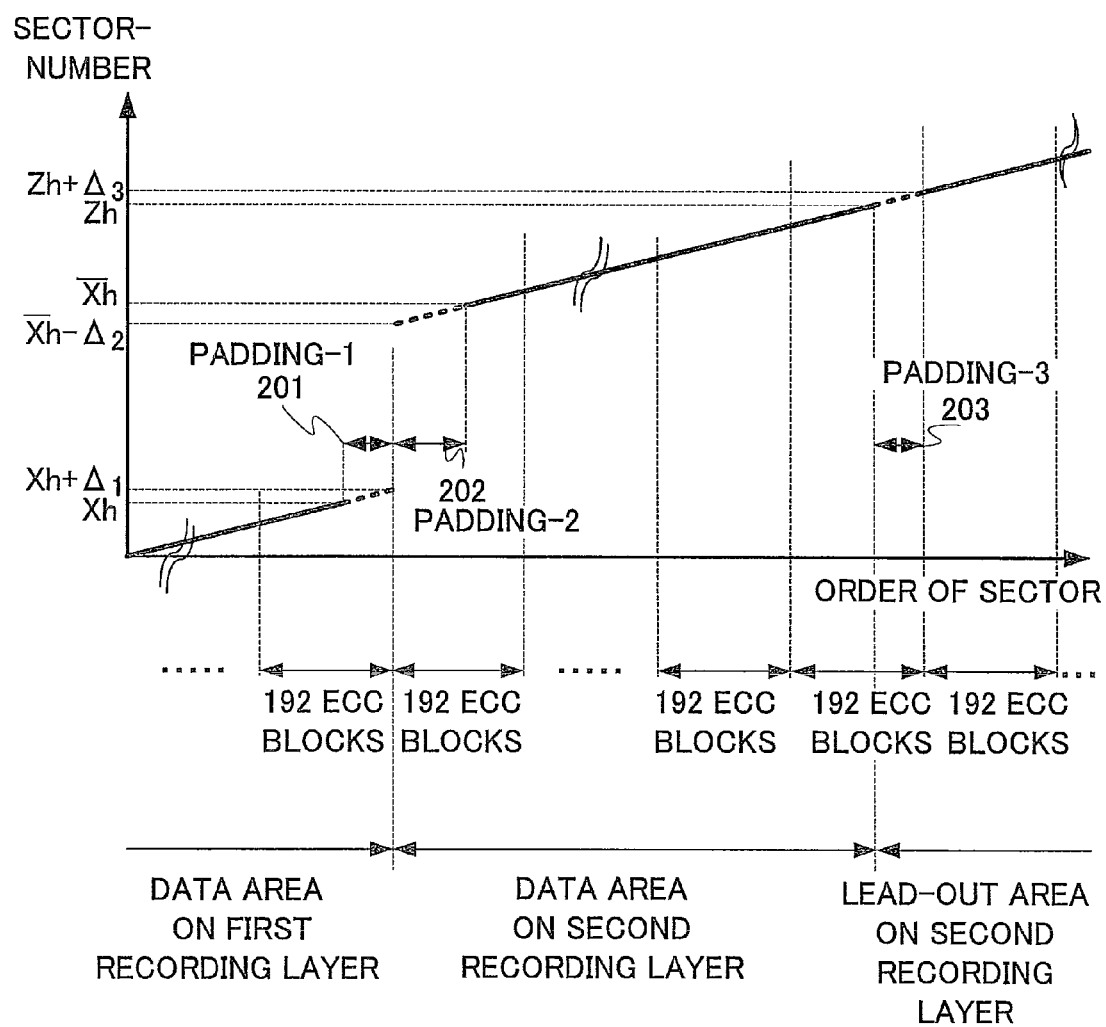
FIG. 21 is a diagram for explaining operation of the information recording apparatus according to the first embodiment and illustrates yet another example of the data recorded in each file of the disk image data.

FIG. 21 is a diagram illustrating an example of another part of data recorded in each file of the disk image data. In FIG. 21, a horizontal axis denotes an order of the arrangement of the sectors, and a vertical axis denotes a sector-number assigned to each sector. Although FIG. 21 illustrates an example in which the packing is performed by the 48-sector mode (FIG. 12), the packing may be performed by the 47-sector mode (FIG. 15). This example shows processing on an ending portion of the file "data-layer2.dits" 126 of data of the data area on the second recording layer. If a sector of a sector-number Zh at an ending portion of the data cannot be in alignment with a boundary of the ECC clusters, the padding data are inserted as the "padding-3" 203 shown in FIG. 21 to make a full length of data an integer multiple of 192 ECC blocks so as to in alignment with a boundary of the ECC clusters. The number of sectors corresponding to the "padding-3" 203 is $\Delta_3$ sectors as shown in FIG. 21. Although the lead-out area follows the ending portion of the data area on the second recording layer, since all of the data in the lead-out area are prescribed to be set to zero and there is no need to access there, only a required number of sectors may be stored in the "padding-3" 203 from a leading sector of the lead-out area.

In FIG. 21, the data obtained by removing a part of the above-described "padding-3" 203 from a part described as the "lead-out area" become the file "lead-out.dits" 129 shown in FIG. 7. The data in the lead-out area keep a length prescribed in the DVD standard and all data are set to zero. If the ending portion of the file "data-layer2.dits" 126 shown in FIG. 7 is subjected to the above processing, the leading portion becomes in alignment with a boundary of the ECC clusters, thereby making a sector-number a multiple of 192.

As described above, by dividing the disk image data of the data area into the data on the first recording layer and the data on the second recording layer and by introducing some scheme into each terminal processing of the file "data-layer1.dits" 125 of the disk image data of the data area on the first recording layer and the file "data-layer2.dits" 126 of the disk image data of the data area on the second recording layer, the access control to the disk image data of the content for DVD becomes easier.

Further, the case of a single-layer disk is easier than the case of the above-described dual-layer disk, both the data area and the lead-out area exist only on the first recording layer. With regard to the example of the content authored for DVD (#1) 11 on the single-layer disk in FIG. 7, the file "data-layer.dits" 112 of the disk image data of the data area is subjected to the storing processing in a similar manner to the file "data-layer1.dits" 125 of the disk image data of the data area of the above-described first recording layer, and subsequently is added by the file "lead-out.dits" 119 of the data in the lead-out area.

Furthermore, in the example having a different file structure of the case shown in FIG. 6, the file of the disk image data in each area may be stored in a similar manner to the above-described example. Each of a boundary between the file system-1 area and the user file area and a boundary between the user file area and the file system-2 area is in alignment with a boundary of the ECC clusters in units of 192 ECC blocks.

FIG. 22 is a diagram illustrating a way of calculating an ECC cluster-number of the recordable large-capacity optical disk, on which a sector assigned a sector-number is recorded, from the sector-number on the DVD. FIG. 22 shows as an example in which a size of the content authored for DVD in the data area of the first recording layer is set to a value so that the number of the ECC blocks becomes a multiple of 192 (here, multiplied by 688), 192×688=132,096 blocks. Accordingly, a size of the content authored for DVD in the data area of the first recording layer becomes, as the number of the sectors, $$132,096 \times 16 = 2,113,536 \text{ sectors,}$$

and the recording capacity is approximately 4.3 Gbytes. The sector-numbers are from 30000h to 233FFFh. That is, Xh=233FFFh. Further, if a size of the data area of the second recording layer is the same, the sector-numbers are from DCC000h to FCFFFFh. That is, $\overline{X}h$=DCC 000 h, and Zh=FCFFFFh. Furthermore, since there is no need to perform the padding, $\Delta_1$=0, $\Delta_2$=0, and $\Delta_3$=0.

The ECC cluster on the recordable large-capacity optical disk corresponding to the ECC block on the data area of the first recording layer of the content authored for DVD is assumed to begin from the ECC cluster-number Ph=100000h on the disk. Since the number of the ECC clusters corresponding to the number of the ECC blocks 132,096 is $$99 \times 688 = 68,112 \text{ clusters,}$$

the ECC cluster-numbers are from 100000h to 110A0Fh. Further, the ECC cluster corresponding to the ECC block of the data area of the second recording layer of the content authored for DVD is assumed to begin from an ECC cluster-number Qh on the disk. Since if a file is recorded so that the ECC clusters of the data area of the second recording layer are arranged subsequent to the last ECC cluster of the data area of the first recording layer, $$Qh=110A10h \text{ holds, and}$$

the number of the ECC clusters is $$99 \times 688 = 68,112.$$

Therefore, the ECC cluster-numbers are from 110A10h to 12141Fh.

Whether a sector of the content authored for DVD is positioned at the data area of the first recording layer or at the data area of the second recording layer can be determined based on whether its sector-number is less than 800000h or not less than it. Since a size of a gap of the sector-numbers between the layers can be calculated by ($\overline{X}h-(Xh+1)$), by subtracting ($\overline{X}h-(Xh+1)$) from the sector-number when the sector-number is not less than 800000h to make the sector-numbers on the first recording layer and the second recording layer consecutive, a common calculation equation can be applied to the data areas of the first recording layer and the second recording layer.

S denotes a sector-number of the content authored for DVD,

S' denotes a sector-number of the content authored for DVD (which is consecutive on the first recording layer and the second recording layer), X denotes the last sector-number of the data area of the first recording layer of the content authored for DVD, $\overline{X}h$ denotes a leading sector-number (a complement number obtained by bit-reversing X) of the data area of the second recording layer of the content authored for DVD, Z denotes the last sector-number of the data area of the second recording layer of the content authored for DVD, B denotes an ECC block-number of the content authored for DVD, P denotes an ECC cluster-number of a leading portion on the recordable large-capacity optical disk, at which data of the data area of the first recording layer of the DVD is stored, Q denotes an ECC cluster-number of a leading portion on the recordable large-capacity optical disk, at which data of the data area of the second recording layer of the DVD is stored, and C denotes an ECC cluster-number of the recordable large-capacity optical disk.

i) When S<80000h, $S'=S$, and $C=[[(S'-30000h)/10h]\times(99/192)]+P$ hold.

ii) When S≧80000h,
C can be obtained from S using $S'=S-(\overline{X}h-(Xh+1))$, and $C=[[(S'-30000h)/10h]\times(99/192)]+Q$.

Here, a mark expressed by [a] means a computation for discarding the fractional portion of the value "a". Furthermore, [(S−30000h)/10h]=B.

Although the above-described example is a case where no padding is used and $\Delta_1=0$, $\Delta_2=0$, and $\Delta_3=0$ hold, when the padding is used, Xh should be replaced by (Xh+$\Delta_1$), and $\overline{X}h$ should be replaced by ($\overline{X}h-\Delta_2$). In a similar manner to the above-description, an ECC cluster-number corresponding to a sector-number can be calculated by causing a boundary of the ECC blocks to be in alignment with a boundary of the ECC clusters.

FIG. 23 is a diagram illustrating a configuration of a location table of the sectors of the DVD. As illustrated in FIG. 12, each sector group 302 including 48 sectors includes 1 packet of the control packet 301, and the control packet 301 contains the control information for accessing the arrangement unit including another sector of the content and an ECC cluster. The control information of the control packet 301 is the information for calculating the positions of the ECC clusters and the arrangement unit on the recordable large-capacity optical disk storing the data of its sector quickly when a sector-number of the DVD to be accessed is given at the time of reproducing.

A method of calculating an ECC cluster-number on the recordable large-capacity optical disk to be accessed by the sector-number of the content authored for DVD has been described above, and the information used here is stored in the control packet 301 as follows. In FIG. 23, X denotes the last sector-number on the data area of the first recording layer of the DVD image, Z denotes the last sector-number on the data area of the second recording layer of the DVD image, $\Delta_1$ denotes the number of the sectors of the padding of an ending portion of the data area of the first recording layer of the DVD image, $\Delta_2$ denotes the number of the sectors of the padding of a leading portion of the data area of the second recording layer of the DVD image, $\Delta_3$ denotes the number of the sectors of the padding of an ending portion of the data area of the second recording layer of the DVD image, P denotes an ECC cluster-number, at which a leading portion of the data area of the first recording layer of the DVD image is stored, Q denotes an ECC cluster-number, at which a leading portion of the data area of the second recording layer of the DVD image is stored, and C denotes an ECC cluster-number, at which a leading sector of a sector group (302 in FIG. 12) is stored.

Further, considering a case where a packet is divided when it is recorded in an ECC cluster, the "leading sector of sector group" is assumed to be a leading portion of the packet including the first byte of the target sector.

The disk image data of the data area of the first recording layer includes the data of the data area of the first recording layer among the file system-1 area 73 and the user file area 74. The disk image data of the data area of the second recording layer include the data of the data area of the second recording layer of the user file area 74 and the data of the file system-2 area 78. By making it possible to detect a boundary between a file system area and a user file area quickly, it becomes easy to access a user file and to perform the data management in a file system. For this reason, the control packet 301 is caused to contain the following information U and V.

U denotes an ECC cluster-number, at which a leading portion of a user file area of the first recording layer of the DVD image is stored, and V denotes an ECC cluster-number, at which a leading portion of a file system area of the second recording layer of the DVD image is stored.

The above-described ten kinds of information are expressed by the 4-byte length respectively; the 4-byte packet identification code ID are added to a leading portion of the packet, and a total of these, 44 bytes, is stored in the 188-byte control packet 301. Since this information is disposed at each sector group (a reference numeral 302 in FIG. 12) minutely, it becomes possible to access quickly to the data on the recordable large-capacity optical disks having different formats. Further, by expressing the ECC cluster-number described by a parameter C as the 8-byte length, the recording data on the HDD with larger capacity becomes possible.

As has been described above, according to the information recording apparatus and the information recording method of the first embodiment, since it becomes possible to use the contents authored for DVD for download distribution without reauthoring, the cost for the content reauthoring can be removed and therefore it becomes possible to supply the contents at a low price.

Further, according to the information recording apparatus and the information recording method of the first embodiment, it becomes possible to record a plurality of the contents authored for DVD downloaded by the user on a large-capacity optical disk and a user is allowed to combine freely a plurality of titles of the contents to be recorded on the large-capacity optical disk.

Furthermore, according to the large-capacity optical disk, on which data are recorded by the information recording apparatus and the information recording method of the first embodiment, or the information reproducing apparatus and the information reproducing method for this large-capacity optical disk, with regard to a large-capacity optical disk storing a plurality of titles of the contents authored for DVD, it becomes possible to improve access performance when the content is being played and to improve access performance, such as speed and smoothness at the fast-forwarding or fast-reversing, quickness of the skip or jump operation, and reduction of time required for searching for a desired part, when various kinds of special reproduction are performed.

Moreover, according to the information recording apparatus and the information recording method of the first embodiment, since the protection is performed by adopting the predetermined copyright protection scheme for a large-capacity optical disk in addition to the predetermined scheme for a DVD, the more secure copyright protection of the content becomes possible.

Furthermore, according to the information recording apparatus and the information recording method of the first embodiment, since the control information for restricting the access to a specific area of the DVD is added, the more secure copyright protection becomes possible by preventing the unauthorized access.

Second Embodiment

In the first embodiment, as illustrated in FIG. 9, the description has been made as to the example that only the sector 85 with the 2064-byte sector length, which is composed of the 12-byte header area 81, the 2048-byte main data 82, and the 4-byte error detection code 83 among the areas in the 2418-byte physical sector 80, is recorded on the hard disk 50 and the recordable large-capacity optical disk 90 as the disk image data of the content authored for DVD, and the 302-byte error correction code (ECC) 87 and the 52-byte synchronization information (SYNC) 86 contained in the physical sector 80 are added by the optical disk device 60 when the disk image data are recorded on the recordable DVD 70. However, by causing the disk image data to include the error correction code 87 and the synchronization information 86 contained in the physical sector 80, the optical disk device 60 can omit the error-correction coding processing and the like when the disk image data are recorded on the recordable DVD 70, and therefore the control operation of the optical disk device 60 can be simplified.

Therefore, in the second embodiment, a description will be made as to a method of arrangement that can bring the sector 85 of the DVD closer to the units of the accessing on the recordable large-capacity optical disk 90 as close as possible when the disk image data are caused to include the error correction code 87 and the synchronization information 86 in addition to the sector 85.

In the second embodiment, as illustrated in FIG. 10, the 188-byte packet 300 are used for data management, and the 4-byte packet header is added to the packet 300, thereby forming the source packet 310. This point is the same as that in the first embodiment. In addition, the arrangement is made so that the sector of the DVD can be brought closer to the units of the accessing on the recordable large-capacity optical disk 90 as close as possible.

The recording method of the second embodiment mainly aims to simplify the processing when the recording is being performed on the recordable DVD 70. However, since by using the recording method of the second embodiment, a rule is simplified also in the recordable large-capacity optical disk 90 when causing a boundary of the sectors of the data of the content authored for DVD included in the disk image file to be in alignment with the units of the accessing on the recordable large-capacity optical disk, in which the disk image file is written, in compliance with the predetermined rule, the accessing to the target sector containing data of the content authored for DVD can also become easy when the reproducing equipment plays back the recordable large-capacity optical disk 90. Accordingly, the record medium, to which the recording method of the second embodiment is applied, may include the recordable large-capacity optical disk 90, in addition to the hard disk 50 provided in the primary recording means 5 and the recordable DVD 70 provided in the secondary recording means 6.

Figure 24:
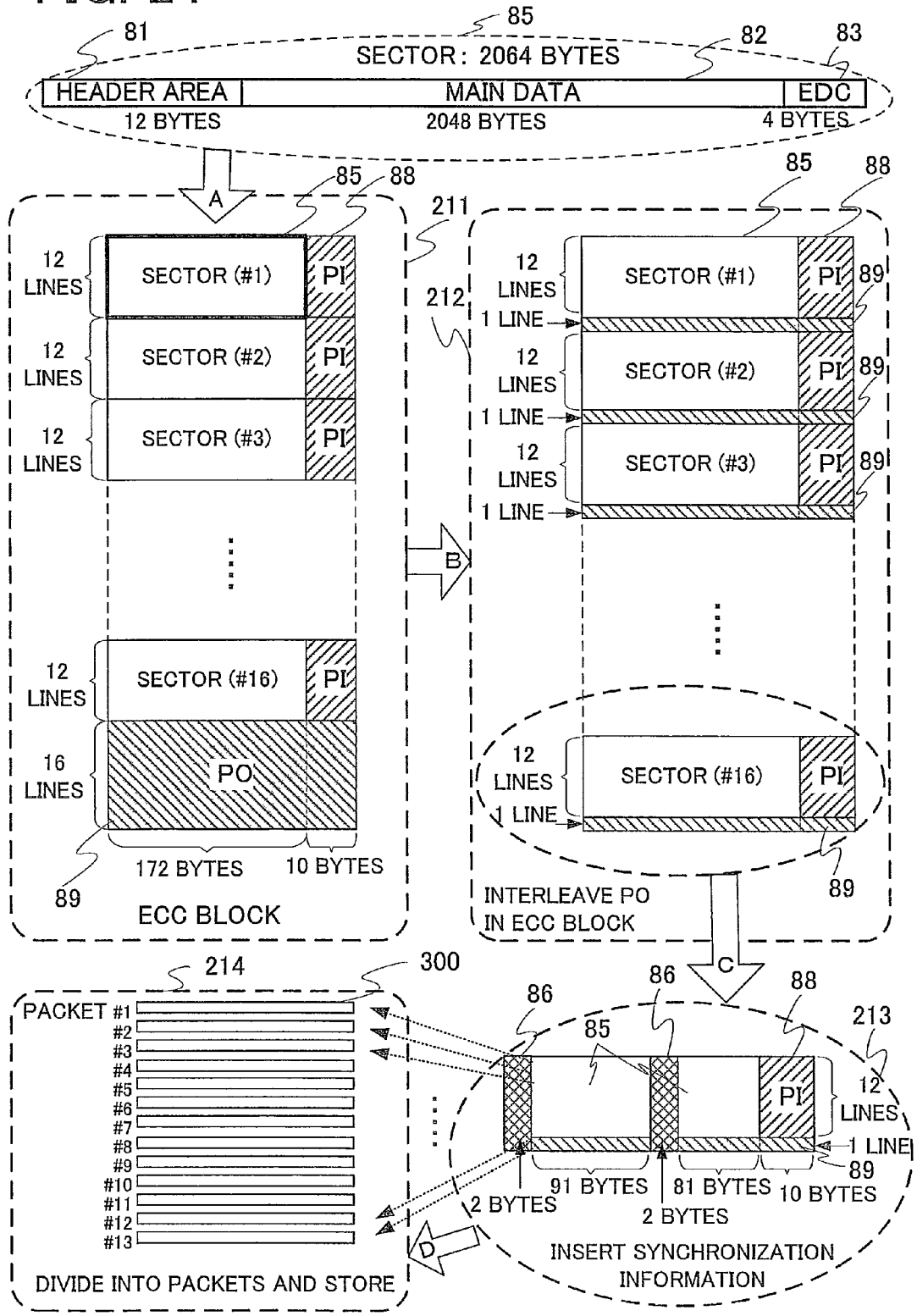
FIG. 24 is a diagram for explaining operation of the information recording apparatus according to the second embodiment of the present invention and illustrates the sectors of the DVD, a way of processing the data of the ECC block, and a way of storing the data in packets.

FIG. 24 is a diagram for explaining operation of the information recording apparatus according to the second embodiment of the present invention and illustrates the sectors 85 of the DVD, a way of processing data in an ECC block (broken-line parts 211, 212, 213), and a way of storing in packets (a broken-line part 214).

A broken-line part (a part surrounded by an oval) in an upper side of FIG. 24 is the sector 85 composed of the header area 81, the main data 82, and the EDC 83, which have already been described with reference to FIG. 9. In the second embodiment, first, 16 sectors are collected along an arrow A in FIG. 24 to constitute an ECC block. As shown around a center of the left side in FIG. 24 as a broken-line part (ECC block) 211, first, the data of each sector are arranged so as to form 172 bytes×12 lines, and 16-sector data (i.e., sectors #1-#16) constitute a matrix of 172 bytes×192 lines. The 10-byte inner parity (PI) 88 for each line of this matrix is generated and it is added to an ending portion of each line. Next, the 16-byte outer parity (PO) 89 for each line of the matrix, which is formed by 182 bytes×192 lines including the inner parities (PI) 88, is generated and it is added to an ending portion of each line.

Next, along an arrow B in FIG. 24 and as shown around a center of the right side in this figure as a broken-line part (PO is interleaved in the ECC block) 212, the interleave processing is performed by generating 16-line outer parities (PO) 89 as a total, separating each line, and moving and inserting the separated one into a position after a line of each sector (i.e., sectors #1-#16). The data recorded in the physical sector are 182 bytes×13 lines, which are a total of the sector 85 and the inner parity (PI) 88 of 182 bytes×12 lines for each sector and the outer parity (PO) 89 of 182 bytes×1 line. For each physical sector, a total 302-byte of the 120-byte inner parity (PI) 88 and the 182-byte outer parity (PO) 89 is the error correction code (ECC) 87 shown in FIG. 9.

Next, along an arrow C in FIG. 24 and as shown around the lower right side in this figure as a broken-line part (insertion of synchronization information) 213, each line of the 13-line physical sectors is divided into two parts each including 91 bytes, and two items of synchronization information 86 each having a 2-byte length are inserted into a leading portion and a central portion. As a result, each line has a 186-byte length. Each line is referred to as a synchronization frame.

Finally, along an arrow D in FIG. 24 and as shown around the lower left side on this figure as a broken-line part (dividing into packets and storing) 214, by storing each line of the physical sector of 186 bytes×13 lines, that is, the synchronization frame, in each packet 300 with a 188-byte length, 13 lines of packets (i.e., packets #1-#13) 300, each having a 188-byte length are generated. Since a packet length is 188 bytes and a synchronization frame is 186 bytes, 2 bytes as fraction bytes are left for each packet.

As described above, all sectors constituting an ECC block are divided based on the same rule and stored in the packets. By packing as described above, since processing can be performed in the shortest unit of the accessing called as a sector, the control can be simplified extremely. Further, since by storing the disk image data in a packet in units of the synchronization frame, the unit of the data processing in the DVD is caused to coincide with the unit of the data processing in the hard disk 50 or the recordable large-capacity optical disk 90 even when they are recorded on the hard disk 50 or the recordable large-capacity optical disk 90, an advantage that the access control become easier arises. At this time, since the fraction byte is a little, all data of the physical sector can be stored in 13 packets (i.e., packets #1-#13 shown in FIG. 24) efficiently.

Further, in the second embodiment, the data of the 1-line synchronization frame to be stored in 1 packet is set to 186 bytes inclusive of the synchronization information 86. Here, when the data are recorded on the recordable DVD 70, the synchronization information 86 is subjected to processing which is different from that of other data or the error correction code 87. In other words, the synchronization information 86 is added as a pattern of the channel bit in the optical disk device 60 when the data are modulated to a channel bit in order to record the data on the disk, and the pattern of the channel bit is set to a unique one which does not appear when the data are modulated to the channel bit. Although it has a length corresponding to 2-byte data at each position, it cannot be expressed as a value of the data. Therefore, in order to express it as the disk image data, a special rule for recognizing as the synchronization information is required with respect to the data of a specific byte position in which the synchronization information in packet is written. Since such processing causes a loss of general versatility, it is preferable that such processing be omitted in order to avoid the complication of control if possible. The synchronization information 86 may be added in the optical disk device 60 when the disk image data are recorded on the disk. This can realize further simplification of the system. In this case, the data of the 1-line synchronization frame to be stored in 1 packet are 182 bytes. For each packet, 6 bytes are left as a fraction.

Figure 25:
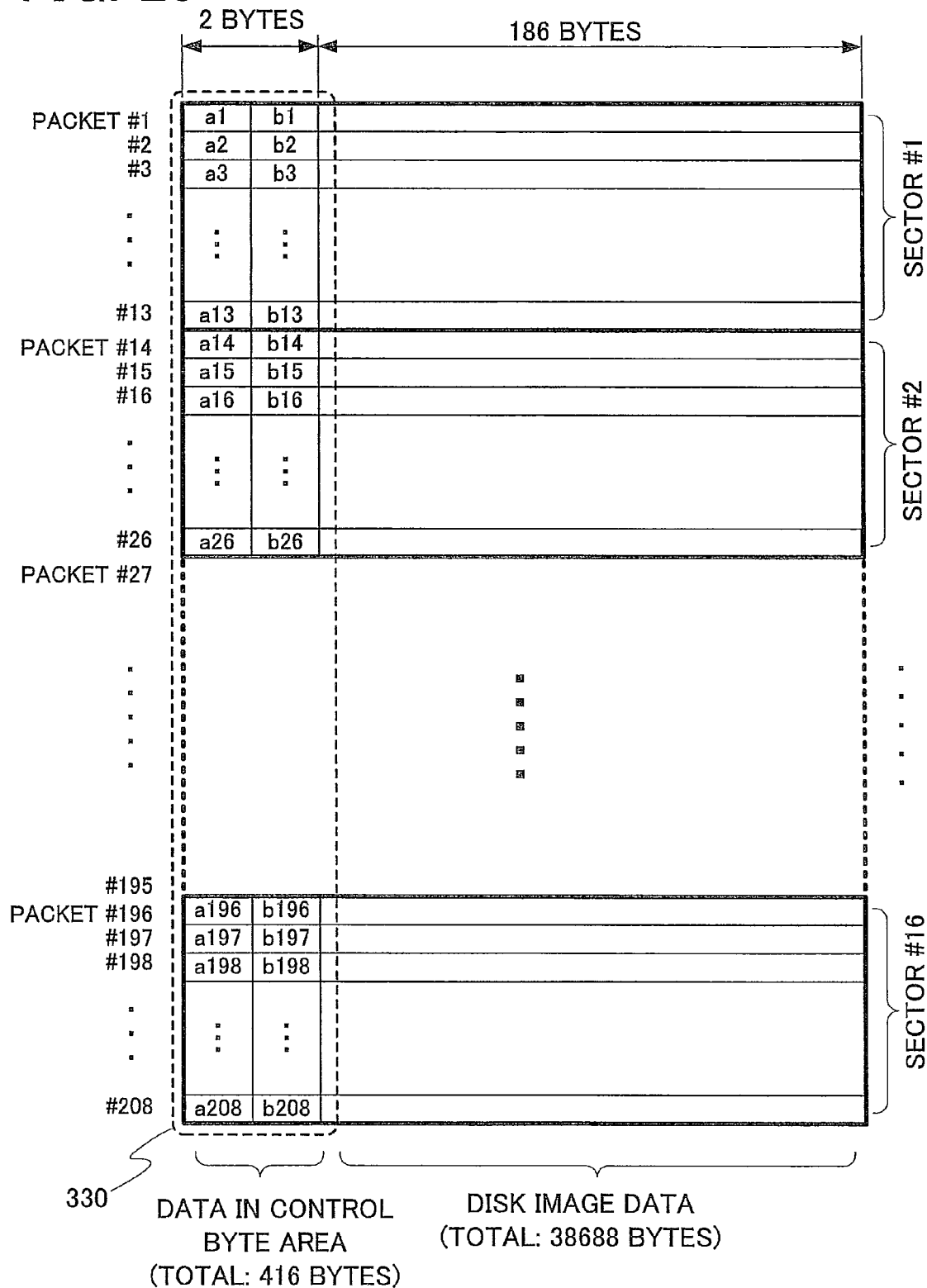
FIG. 25 is a diagram for explaining operation of the information recording apparatus according to the second embodiment and illustrates a configuration for storing data of the 2418-byte physical sector in 13 packets.

FIG. 25 is a diagram illustrating a configuration for storing data on a 2418-byte physical sector 80 in 13 packets 300. The 186-byte data corresponding to the 1-line synchronization frame are stored in 1 packet, and the data of 1 physical sector are stored in 13 packets (i.e., the packets #1-#13, the packets #14-#26, . . . , the packets #196-#208 shown in FIG. 25). In this time, the control information is stored in 2 bytes as a fraction which is left in each packet. Since in the DVD format, an ECC block is formed from the collected 16 sectors, 208 packets (i.e., the packets #1-#208 shown in FIG. 25) correspond to 1 ECC block. In this way, since if the 1-line synchronization frame is stored in 1 packet, the units of the disk image data coincide with the units of the packet in both a sector as units of the accessing and an ECC block, the searching for a desired part becomes extremely easy when the contents are reproduced. By collecting the 2-byte fraction which is left in the respective packets, 26 bytes are left in 1 sector and 416 bytes are left in 1 ECC block. These are collected in each sector or in each ECC block and are used as a control byte area 330 for storing the control information such as the access.

Byte names of the control byte area 330 are given as a1-a208, b1-b208, as shown in FIG. 25. To be more specific, the leading bytes in the respective packs forming the ECC block are named as a1, a2, a3, . . . in order from the leading byte of the leading packet #1 to the leading byte a208 of the last packet #208. Similarly, the leading bytes in the respective packs forming the ECC block are named as b1, b2, b3, . . . in order from the second byte of the leading packet #1 to the second byte b208 of the last packet #208. A function of each byte of the control byte area 330 configured as described above will be described later. Further, if the disk image data do not include the synchronization information 86 and 1-line data of the synchronization frame to be stored in 1 packet are set to 182 bytes, it is preferable that 6 bytes of a leading portion on each packet be used as the control byte.

Figure 26:
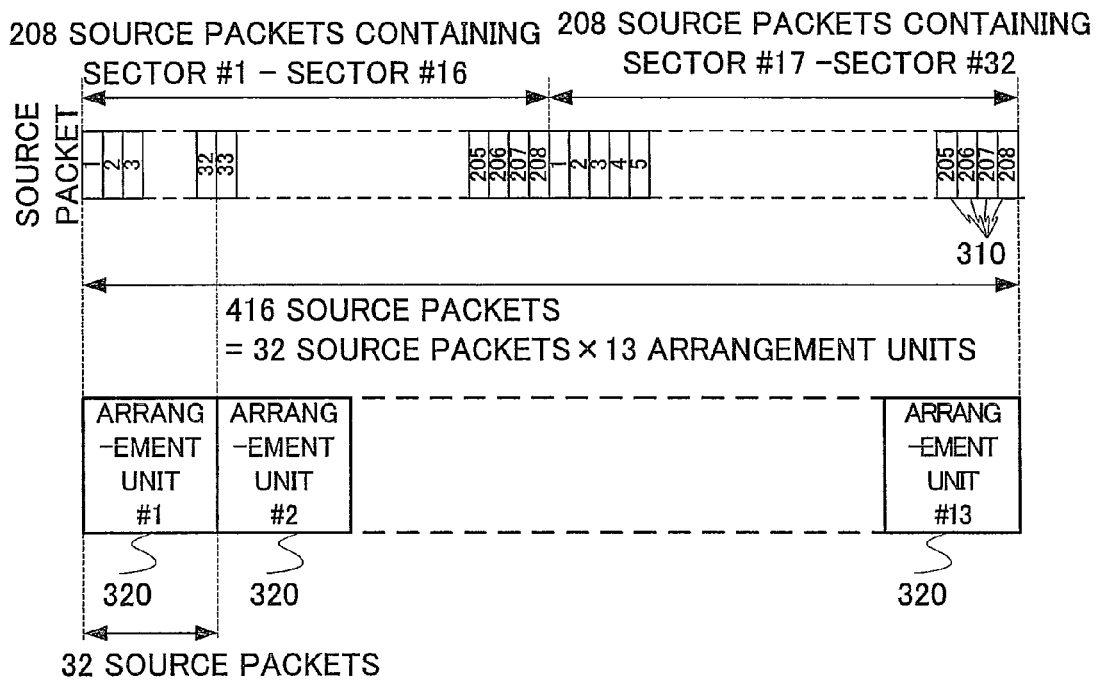
FIG. 26 is a diagram for explaining operation of the information recording apparatus according to the second embodiment and illustrates an example in which 416 source packets constitute 13 arrangement units.

FIG. 26 is a diagram illustrating an example in which 13 arrangement units 320 (i.e., arrangement units #1-#13) are formed by 416 source packets 310. As illustrated in FIG. 26, 1 arrangement unit 320 is formed by 32 source packets 310. The 416 source packets (i.e., source packet arrangement units #1-#13), which is formed by 32-sector data, forms 13 arrangement units 320 (i.e., arrangement units #1-#13).

Figure 27:
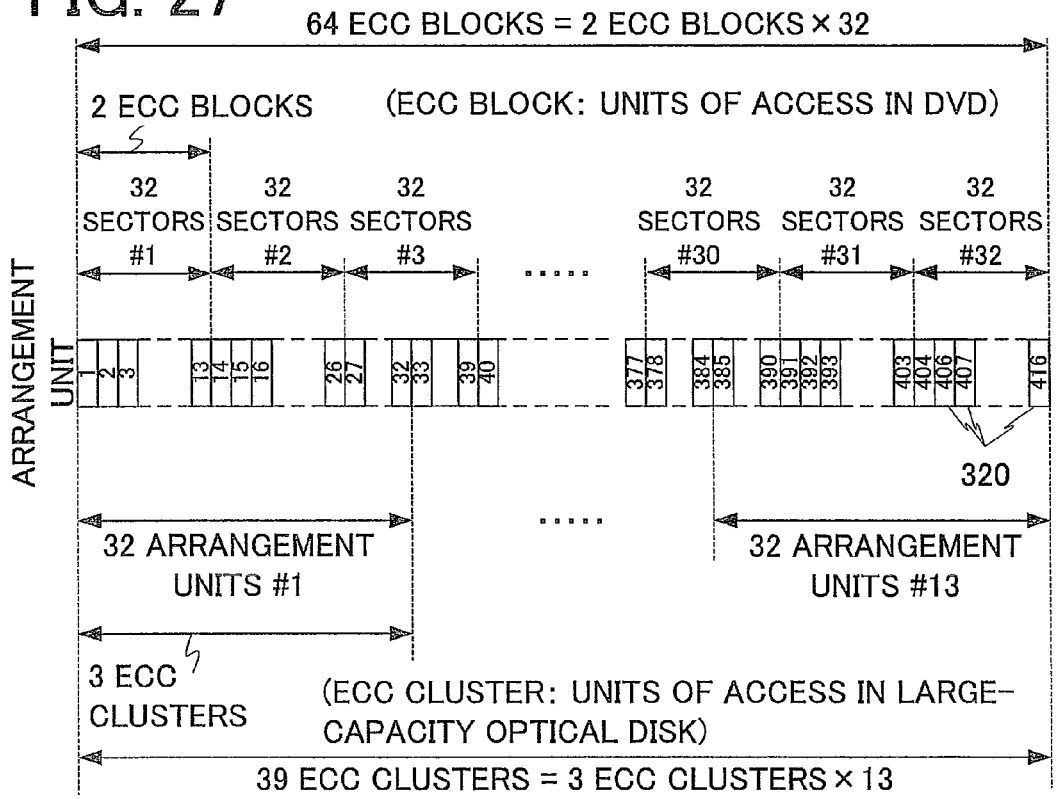
FIG. 27 is a diagram for explaining operation of the information recording apparatus according to the second embodiment and illustrates a relationship among the arrangement units, the ECC blocks of the DVD, and the ECC clusters on the recordable large-capacity optical disk.

FIG. 27 is a diagram for explaining operation of the information recording apparatus according to the second embodiment and illustrates a relationship among the arrangement units, the ECC blocks of the DVD, and the ECC clusters on a recordable large-capacity optical disk. FIG. 27 illustrates a relationship among the 416 arrangement units 320 (i.e., arrangement units #1-#416), the ECC blocks of the DVD, and an ECC cluster on a recordable large-capacity optical disk.

As illustrated in FIG. 27, with regard to the ECC blocks of the DVD, 32 sectors constitute 2 ECC blocks, and a boundary of the ECC blocks are formed by 32 sets of 2 ECC blocks, that is, 64 ECC blocks (32 sectors×32=1024 sectors). Further, as illustrated in FIG. 27, with regard to the recordable large-capacity optical disk, it corresponds to 13 sets of 3 ECC clusters, which are composed of 32 arrangement units, that is, a set of 39 ECC clusters (1248 sectors) on the large-capacity optical disk. Accordingly, if 32 sets of 2 ECC blocks, which are composed of 32 sectors, that is, a set of 64 ECC blocks (32 sectors×32=1024 sectors) of the DVD are used as a unit, a boundary of the ECC blocks coincides with a boundary of the ECC clusters. The disk image data of the content authored for DVD are stored as a size of 2418 bytes×16×64=2,476,032 bytes, and a size of the user data inclusive of a fraction of the packet and a packet header is 2048 bytes×32×39=2,555,904 bytes, on a large-capacity optical disk.

As described above, since a relationship that makes it possible to perform conversion using a simpler integer ratio where 32 ECC blocks of the content authored for DVD correspond to 39 ECC clusters on a recordable large-capacity optical disk can be created, in order to calculate a correspondence between a sector to be accessed specified when the content authored for DVD is being played and a source packet on a recordable large-capacity optical disk when the content authored for DVD recorded on the recordable large-capacity optical disk is being played, address calculation required for access becomes easy. If the data rate when the content is being played is 10 Mbits per second, approximately 2.5 Mbytes of data correspond to a little less than 2 seconds of video. This period of time is within an appropriate range as a temporal resolution at the time of accessing. Further, since data can be read out independently in units of the ECC cluster, it is easy to access with higher accuracy. This packing scheme will be hereinafter referred to as "32-sector mode".

FIG. 28 and FIG. 29 are diagrams illustrating control byte areas 330. The information to be stored in the control byte area 330 is similar to each parameter shown in FIG. 23. However, each parameter shown in FIG. 23 is collected in a single control packet 301, whereas the control byte area 330 shown in FIG. 28 and FIG. 29 is obtained by collecting 2 bytes distributed in each packet in units of the ECC blocks. Further, using the feature that a packet and a sector have one-to-one correspondence, the information indicating an attribute of the sector storing each packet for each unit of the sector is added.

FIG. 28 shows definitions of the parameters of the leading byte of the control byte area. In FIG. 28, definitions of the byte names are the same as those shown in FIG. 25. In FIG. 28, the information on each sector which is complete in 13 bytes as units of the sector is illustrated. In the figure, as a typical example, the definitions of a leading sector of each ECC block, that is, the control bytes a1 to a13 are indicated. With regard to the second sector and the subsequent sectors, the same parameters are allocated in the same order as the byte arrangement in the leading sector. A correspondence between the control bytes a14 to a208 and the bytes a1 to a13 is as shown on a lower side of FIG. 28.

As shown in FIG. 28, the control bytes a1 and a2 are IDs indicating the packet identification codes. The control byte a3 'Area' indicates an area including this sector in the DVD, that is, which area among the lead-in area, the file system-1 area, the user file area, the file system-2 area, and the lead-out area in a disk format of the DVD includes the sector in the disk image. Since whether or not a sector to be accessed in the disk image data is data of a part corresponding to the lead-in area of the DVD can be detected immediately from packets on the control byte 'Area', when the access to this area is an access from a user having no authorization for access, it is possible to disable the access to prevent the unauthorized access, thereby increasing a level of the copyright protection. The control byte a4 'Scp' indicates a state of encryption of this sector, that is, whether this sector is a sector encrypted by CSS or not. Since whether a sector to be accessed in the disk image data is a sector encrypted by CSS or not can be detected immediately, an efficiency of processing at the decryption can be improved. The control byte a5 to a12 of 8 bytes 'C' indicates an ECC cluster-number at which this sector is stored. A difference in comparison with 'C' shown in FIG. 23, is a point that it does not indicate a unit referred to as a sector group but indicates an ECC cluster-number corresponding to a sector itself which is stored in this packet. Owing to this, the fine access control in units of the sector as has been described above becomes possible. The access performance is improved when the content is being played, and the access performances such as speed and smoothness at fast-forwarding or fast-reversing, quickness of skip or jump operation, and reduction of time required for searching for a desired part, when various types of special reproduction are performed, can be improved FIG. 29 shows definitions of the parameters of the second byte on the control byte area. Details of FIG. 29 are as described in FIG. 23, and a case where 4 bytes are allocated to each of the parameters which are the same as those in FIG. 23, except for the parameter C, is described.

Third Embodiment

In the third embodiment, a description will be made as to a format of the contents on the content server 1 shown in FIG. 1, and a process when these contents are transmitted through the network 2 to the information recording apparatus 3 of the user (an information transmitting apparatus and an information transmitting method). Furthermore, a description will be also made as to a processing method when the information transmitted in such way is recorded on the DVD (an information recording apparatus and an information recording method).

In the information transmitting apparatus or method according to the third embodiment, the content data including a video signal are compressed/encoded to be converted to a program stream, the program stream is divided into the packs having a constant length, which are units of the storing in a sector of the record medium, the data divided into the packs are error-correction coded to form an error correction block by the predetermined number of the sectors, the error-correction coded data arranged in order of the recording on a track of the record medium is divided into the units of the storing in the packets of a transport stream, the transport stream is transmitted in units of the packet, and when the error-correction coded data are divided into the units of the storing in the packets of a transport stream, the unit of storing in the packets of a transport stream is set to the error correction code word used when an error correction block is formed for error-correction coding.

Further, in the information recording apparatus or method according to the third embodiment, the content data including a video signal is compressed/encoded to be converted to a program stream, the program stream is divided into the packs having a constant length, each of which is a unit for storing in a sector of the record medium, the data divided into the packs is error-correction coded by forming an error correction block from the predetermined number of the sectors, the error-correction coded data arranged in order of the recording on a track on the record medium is divided into the units to be stored in a packet of the transport stream, the data transmitted as the transport stream are recorded on the record medium in units of the packet, when the data are recorded on the record medium, an integral number of the error correction clusters are formed using the predetermined number of the consecutive packets as units of the conversion, and the data of the transport stream are recorded so that a length which causes a boundary of the units of the conversion to coincide with a boundary of the error correction clusters is treated as a unit, or data padding is performed as necessary so that an ending portion of the data of the transport stream terminates at the coincided boundaries of the units of the conversion and of the error correction clusters.

The information transmitting apparatus and method and the information recording apparatus and method according to the third embodiment will be described below. The DVD content which has been subjected to authoring is divided into packs which are units to be stored on the record medium, after the video data, the audio data and the subvideo data are processed to form separate streams for the respective data types. For example, although the video data are video-encoded for each GOP which is a unit of processing when the video-encoding is performed, the stream of the video-encoded data is divided into video data packs for each 2048-byte length. If a fraction appears at an ending portion of the pack, the meaningless data bits are added so that a pack with a 2048-byte length is caused to be complete. Similarly, the audio data are audio-encoded for each audio frame which is a unit of processing when the audio-encoding is performed, and the stream of the audio-encoded data is divided into audio data packs for each 2048-byte length. Furthermore, similarly, with regard to the stream of the subvideo-encoded data for describing the data such as subtitles, the stream of the sub-video-encoded data is also divided into subvideo data packs for each 2048-byte length.

As has been described above, in order to transmit each encoded data as separate streams in accordance with types of data and record it on the record medium, when the multiplexing is performed on one dimensional axis, the program stream scheme is used in DVD. In other words, a multiplexed stream is formed by arranging the streams, each of which is a pack subjected to division and having a constant length of 2048 bytes, in appropriate order using a pack as a unit. In addition, the control data indicating an order of the reproduction of these video and audio and the control data such as access information used when the special reproduction is performed or the searching processing is performed are formed so as to be stored in the control data pack of a 2048-byte length, and are disposed in a string of the packs of the above-described multiplexed stream.

When the data subjected to such authoring are recorded on a disk as the DVD, 1 pack is stored in 1 sector. Therefore, each pack described above is stored in the main data 82 of each sector shown in FIG. 9. In addition, a header area 81 of 12 bytes and an error detection code 83 of 4 bytes are added to each sector, and when an ECC block 211 is formed in compliance with processing illustrated in FIG. 24, an error correction code (ECC) 87 is calculated and a distributed part is inserted in the sector.

Further, in the recordable large-capacity optical disk 90, as has been described with reference to FIG. 10, when the content data are accessed on the application layer for processing video data and audio data, a packet 300 of 188 bytes is used as a minimal unit of data management. In each embodiment described above, for the purpose of matching the minimal unit of data management, when the data of the DVD content are recorded on the recordable large-capacity optical disk 90 or the HDD 50, the packet 300 is used as units of the data management, and it can be dealt with consistently, and therefore the system configuration of the whole content recording/reproducing system is simplified.

Furthermore, in general, the minimal unit of data length when the data are transmitted through the network is usually a transmission packet 340 of 188 bytes. Therefore, in the third embodiment, by performing processing of the stream when the content server 1 distributes the DVD contents as described below, high efficient processing throughout the contents distributing/recording system can be realized. The main points in the third embodiment are, when the content server 1 transmits the DVD contents authored by the program stream scheme to the network 2 in order to cause the information recording apparatus 3 to store it, that the configuration of the transmission packet 340 is caused to match the configuration of the packet 300 in advance when it is recorded on the HDD 50 or the recordable large-capacity optical disk 90, and that the configurations of the transmission packet 340 and the packet 300 are caused to be associated with units of the processing of the error correction code of the DVD.

FIG. 30 is a diagram illustrating a method of generating transmission packets 340 when the content server 1 sends out the DVD content to the network 2. The data of the DVD contents subjected to authoring in the content server 1 are error-correction coded in compliance with the same procedures as those described in FIG. 24. First, the data of each sector are arranged so as to form 172 bytes×12 lines, and 16-sector data (i.e., sectors #1-#16) constitutes a matrix of 172 bytes×192 lines. A 10-byte inner parity (PI) 88 for each line of this matrix is generated to add it to an ending portion of each line. Next, a 16-byte outer parity (PO) 89 for each line of the matrix, which is formed by 182 bytes×192 lines including the inner parities (PI) 88, is generated to add it to an ending portion of each line. First, as shown in FIG. 24, along an arrow A, the inner parities (PI) 88 and the outer parities (PO) 89 are generated and added to constitute an ECC block 211, and next, along an arrow B, the interleave processing for inserting the outer parity (PO) 89 of 1 line into each sector is performed, thereby constituting the PO-interleaved ECC block 212. In the interleaved ECC block 212, a set of 13 lines which is composed of 12 lines and 1 line shown in FIG. 24 constitutes the data of 1 physical sector.

With regard to the data of the DVD contents stored in the content server in units of the ECC block in this way, along an arrow E in FIG. 30, the data of 1 physical sector storing data corresponding to 1 pack of contents data are divided into 13 transmission packets 340. 1 line of ECC block, that is, 182-byte data are included in each transmission packet 340.

Since the transmission packet 340 is constituted as described above, at least one inner parity (PI) 88 which is a part of an error correction code word forming the ECC block is always included in each transmission packet 340. In other words, it is also said that a unit used when the content data are divided to be stored in the transmission packet 340 is set to units of an error correction code word forming the ECC block. In general, when the information recording apparatus 3 receives the transmission packet 340, error detection and correction can be performed for each transmission packet 340. The transmission path error detection and correction processing for correcting the transmission error correction when data transmission is performed through a network are performed separately. However, in the third embodiment, by utilizing a function of error correction which is originally included in the data itself to be transmitted and performing transmission path error detection and correction processing twice, more reliable transmission can be realized.

Figure 31A:
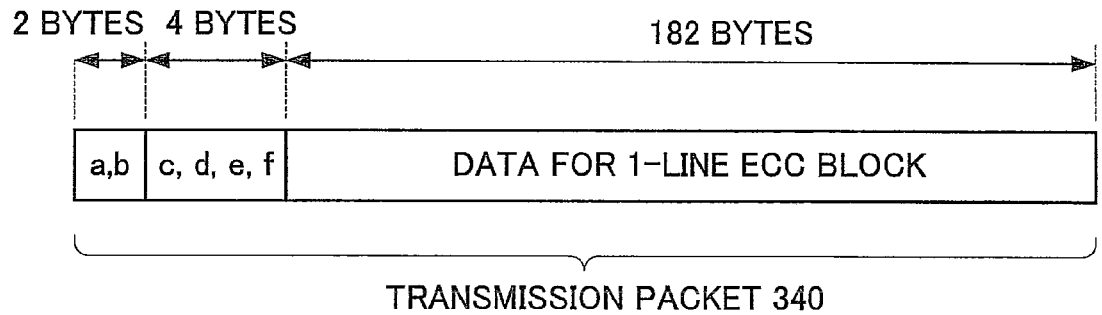
FIGS. 31A to 31C are diagrams illustrating configurations of the transmission packets.
Figure 31B:
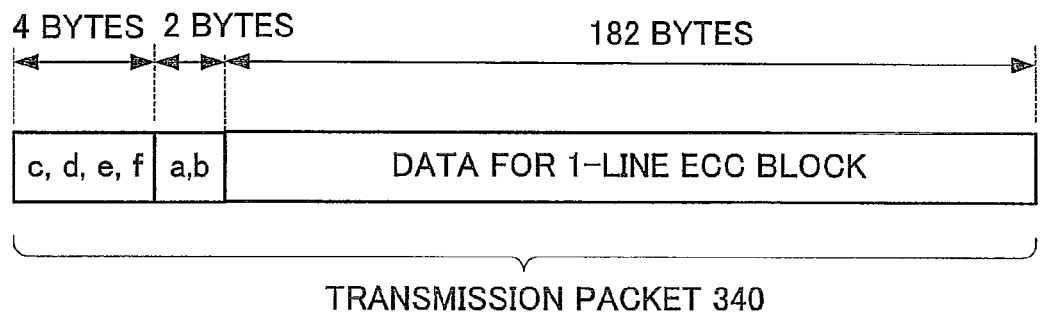
Figure 31C:
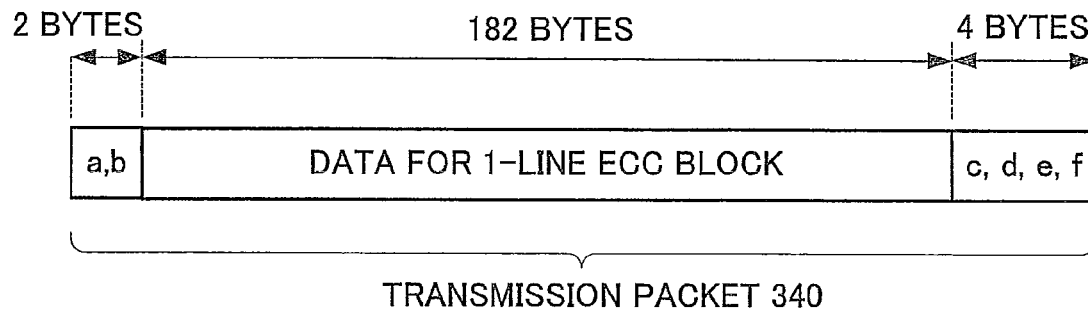

FIGS. 31A to 31C are diagrams illustrating configurations of a transmission packet 340. The transmission packet 340 is a unit for treating the transmission data as a transport stream when the content server 1 transmits the DVD content through the network 2 to the user's information recording apparatus 3, and has a 188-byte length. The transmission packet 340 includes 6-byte data in addition to the 1-line ECC block.

Although it is possible to perform the padding of meaningless data bytes to these 6-byte data, it is also possible to store additional information about the content download. For example, these 6-byte data can be replaced by data of the control byte area shown in FIG. 25. In FIGS. 31A to 31C, 2 bytes indicated by the reference characters "a, b" are the control bytes "an" (n=1, 2, . . . , 13) and "bm" (m=1, 2, . . . , 208), details of which are described in FIG. 28 and FIG. 29. Further, 4 bytes indicated by the reference characters "c, d, e, f" in FIG. 31A to 31C can be used for storing, for example, (1) information about details of contents to be downloaded, (2) information about an order of transmission and a path of transmission of the transmission packets 340 to be downloaded, or (3) information necessary for decryption when the copyright protection scheme such as encryption is adopted when countermeasures against the copyright infringement during transmission are provided.

FIGS. 31A to 31C are diagrams showing an example of location of 182-byte data and control-byte data "a, b" and "c, d, e, f" in the transmission packet 340. When the data are recorded on the primary recording means 5 and the secondary recording means 6 after the information recording apparatus 3 receives this transmission packet 340, it is desirable that the data location format of the control byte be determined so as to make the conversion to the above-described packet 300 easier. The structures shown in FIGS. 31A and 31C are convenient to be identified because in both cases, the data "a, b" are located at a leading portion of the transmission packet 340 and the structures are the same as those of the packet 300. In FIGS. 31B and 31C, the control byte data "c, d, e, f", which are also not provided in the packet 300, are not located between the control byte data "a, b" and 182-byte data, and therefore the structure of the transmission packet 340 has a similar structure to that of the packet 300. Further, when used for the purpose of the above-described item (3), if the control byte data "c, d, e, f" are located at a leading portion or an ending portion of the transmission packet 340, the control byte data "a, b" and the 182-byte data are united and therefore integrated processing becomes easier.

Next, a method of generating the packet 300 when the transmission packet 340 sent from the network 2 is recorded in the information recording apparatus 3 will be described.

In the first method, the 182-byte data, or, the 182-byte data and the control byte data "a, b" shown in FIGS. 31A to 31C are extracted from the transmission packet 340 and stored in the 188-byte packet 300. At this time, the 182-byte data are subjected to processing indicated by an arrow C in FIG. 24, and 4 bytes which mean a total of 2 sets of 2-byte synchronization byte 86 are inserted. By collecting 13 lines of the 182-byte data from 13 transmission packets 340 corresponding to 1 physical sector and performing the inserting processing of this synchronization byte 86, the processing indicated by an arrow D in FIG. 24 is performed and a packet group 214 corresponding to 1 physical sector is generated. As has been described in the second embodiment, it should be noted that the 2-byte synchronization byte 86 is expressed by a bit pattern as a channel bit generated by the recording and modulating processing when the data are recorded on the disk and never has a specific bit pattern as a data byte. Accordingly, in the first method, in order to express it as the disk image data, a special rule for recognizing as the synchronization information is required with respect to the data of a specific byte position in which the synchronization byte 86 in packet is written.

In the second method, the 182-byte data are stored in the packet 300 without inserting the synchronization byte 86 into it, as it is, or, with adding the control byte data "a, b" to it. It is possible to perform the padding of meaningless data bytes to the remaining 4-byte area, or, if there is the control byte data "c, d, e, f", it is possible to store them in this. As described above, the packet group 214 corresponding to 1 physical sector is generated from 13 transmission packets 340 corresponding to 1 physical sector.

As has been described above, by causing a unit used for storing the transmission packet 340 as a packet of the transport stream and a packet 300 used for recording in the information recording apparatus 3 to match to each other, when the DVD contents authored by the program stream scheme on the content server 1 are transmitted to the network 2, it becomes possible to make the data processing on both the content server 1 and the information recording apparatus 3 to be extremely simplified.

Furthermore, similarly, by setting a unit used for storing the transmission packet 340 as a packet of the transport stream to the error correction code word used for forming the error correction block and error-correction coding, when the DVD contents authored by the program stream scheme on the content server 1 are transmitted to the network 2, it becomes possible to realize transmission with high reliability.

Although in the description of the above-described first to third embodiments, a case where the contents authored for DVD are download distributed from the content server 1 to the information recording apparatus 3 and are recorded, when the present invention is applied, the recording on the optical disk is not limited to that on a user's side. The present invention can be applied to a mode in which the content provider itself records the contents authored for DVD on the recordable large-capacity optical disk 90 and supplies it.

Furthermore, although in the description of the above-described first to third embodiments, a case where a type of used recordable large-capacity optical disk is a recordable disk, on which the optical disk device records, has been described, an applicable scope of the present invention is not limited to the recordable optical disk. For example, when the content provider itself records data on the large-capacity optical disk and supplies it, it is possible to apply a format of the present invention to a playback-only type large-capacity optical disk and produce and supply the disk. It is possible to reduce the cost for the disk if data are collected on a single large-capacity optical disk in comparison with the case of using a plurality of current DVDs.

INDUSTRIAL APPLICABILITY

The information recording apparatus, the information recording method, the information reproducing apparatus, the reproducing method, and the information record medium according to the present invention are applicable to a recording apparatus for recording a digitized content of a video, an audio and the like distributed from the content server to a user's recording equipment, a recording method for recording on a record medium, a reproducing apparatus and a reproducing method for reproducing the contents recorded in this manner, and a record medium for storing the content. Further, an information transmitting apparatus and an information transmitting method according to the present invention are applicable to a transmission of a digitized content of a video, an audio and the like from the content server to a user's recording equipment.

What is claimed is:

1. An information transmitting apparatus comprising:
a computer processor programmed to:
convert content data, authored according to the DVD format and including a video signal, to a program stream by compression coding the content data into units of converting;
divide the program stream into packs with a constant length which are units to be stored on a sector of a recording medium;
perform error-correction coding on data of the divided packs by forming an error correction block from the predetermined number of sectors; and
divide the error-correction coded data, which is arranged in an order for recording on a track of the recording medium, into units for storing in respective packets of a transport stream; and
a transmitter for transmitting the transport stream in units of the packet through a network to an information recording apparatus capable of performing a recording operation on the recording medium;
wherein:
each of the units, into which the error-correction coded data is divided for storing in the respective packets of the transport stream, is set to be an error correction code word when the error correction block is formed and the error-correction coding is performed, the units of converting, into which the content data is converted, is set in such manner to allow an integer number of error correction clusters to be formed by the information recording apparatus from a predetermined number of consecutive packets after the transmitting, each of the units of converting follows control bytes in the packet, the sector group is formed by collecting the predetermined number of sectors, and a cluster-number of the error correction cluster for storing a leading sector of the sector group is stored in the control packet.

2. An information transmitting method comprising the steps of:

converting content data, authored according to the DVD format and including a video signal, to a program stream by compression coding the content data into units of converting;

dividing the program stream to packs with a constant length which are units to be stored on a sector of a recording medium;

perform error-correction coding on data of the divided packs by forming an error correction block from the predetermined number of sectors;

dividing the error-correction coded data, which is arranged in an order for recording on a track of the recording medium, into units of storing in respective packets of a transport stream; and transmitting the transport stream in units of the packet through a network to an information recording apparatus capable of performing a recording operation on the recording medium;

wherein each of the units, into which the error-correction coded data is divided for storing in the respective packets of the transport stream is set to be an error correction code word when the error correction block is formed and the error-correction coding is performed, wherein the units of converting, into which the content data is converted, is set in such manner to allow an integer number of error correction clusters to be formed by the information recording apparatus from a predetermined number of consecutive packets after the transmitting, each of the units of the converting follows control bytes in the packet, the sector group is formed by collecting the predetermined number of sectors, and a cluster-number of the error correction cluster for storing a leading sector of the sector group is stored in the control packet.

* * * * *

UNITED STATES PATENT AND TRADEMARK OFFICE
CERTIFICATE OF CORRECTION

PATENT NO. : 8,422,850 B2
APPLICATION NO. : 12/532671
DATED : April 16, 2013
INVENTOR(S) : Kazuhiko Nakane Page 1 of 1

It is certified that error appears in the above-identified patent and that said Letters Patent is hereby corrected as shown below:

ON THE TITLE PAGE:

At item (73), correct the Assignee to read as follows:

--Mitsubishi Electric Corporation, Tokyo (JP)--.

Signed and Sealed this
Twenty-fourth Day of September, 2013

Teresa Stanek Rea
*Deputy Director of the United States Patent and Trademark Office*